United States Patent
Kishimoto et al.

(10) Patent No.: US 12,118,174 B2
(45) Date of Patent: Oct. 15, 2024

(54) DIGITIZER AND ELECTRONIC DEVICE INCLUDING THE SAME

(71) Applicant: Samsung Display Co., LTD., Yongin-si (KR)

(72) Inventors: Hirotsugu Kishimoto, Yongin-si (KR); Yong-Kwan Kim, Yongin-si (KR); Hyunjae Na, Yongin-si (KR); Seokwon Jang, Yongin-si (KR); Chul Ho Jeong, Yongin-si (KR); Sungguk An, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/375,533

(22) Filed: Oct. 1, 2023

(65) Prior Publication Data
US 2024/0220061 A1    Jul. 4, 2024

(30) Foreign Application Priority Data
Dec. 28, 2022   (KR) ........................ 10-2022-0187128

(51) Int. Cl.
*G06F 3/046*   (2006.01)
*G06F 3/041*   (2006.01)

(52) U.S. Cl.
CPC ............ *G06F 3/046* (2013.01); *G06F 3/0412* (2013.01); *G06F 2203/04102* (2013.01)

(58) Field of Classification Search
CPC .................. G06F 3/046; G06F 3/0412; G06F 2203/04102; G06F 3/044; G06F 3/041;
(Continued)

(56) References Cited

U.S. PATENT DOCUMENTS

| 11,314,367 B2 | 4/2022 | Jung |
| 11,570,911 B2 | 1/2023 | Shin et al. |

(Continued)

FOREIGN PATENT DOCUMENTS

| KR | 1020210133342 A | 11/2021 |
| KR | 1020220023952 A | 3/2022 |
| KR | 1020220049066 A | 4/2022 |

OTHER PUBLICATIONS

Galaxy Z Fold3: Untold Stories—Water resistance & S Pen| Samsung. [online]. pp. 1-2 [retrieved on Sep. 29, 2023]. Retrieved from the Internet: <URL: https://www.youtube.com/watch?v=Kvad9HINwn0.
(Continued)

*Primary Examiner* — Michael A Faragalla
(74) *Attorney, Agent, or Firm* — CANTOR COLBURN LLP

(57) ABSTRACT

An electronic device includes: a display panel and a digitizer including first and second non-folding parts and a folding part between the first and second non-folding parts. The digitizer includes a base layer, first loop coils on the base layer and each including a first part on the first non-folding part, a second part on the second non-folding part, and a third part on the folding part, second loop coils below the base layer. The third part includes first patterns adjacent to first ends of first group holes, second patterns adjacent to second ends of second group holes, and third patterns connecting the first and second patterns. Each of the first and second patterns has a curvature.

20 Claims, 18 Drawing Sheets

(58) Field of Classification Search
CPC . G06F 3/14; G06F 4/16; G06F 1/1618; G06F 1/1643; H05K 5/00; H05K 5/02
See application file for complete search history.

(56) References Cited

U.S. PATENT DOCUMENTS

| | | |
|---|---|---|
| 11,592,951 B2 | 2/2023 | Kishimoto et al. |
| 2023/0067179 A1* | 3/2023 | Kim .................... G06F 1/1652 |

OTHER PUBLICATIONS

How Samsung beefed up its new folding phones: metal, tape, and a dab of goo. pp. 1-17 [retrieved on Mar. 22, 2023]. Internet: <URL: https://www.theverge.com/22619139/samsung-galaxy-z-fold-3-flip-screen-durability-waterproof-aluminum.

* cited by examiner

FIG. 1B
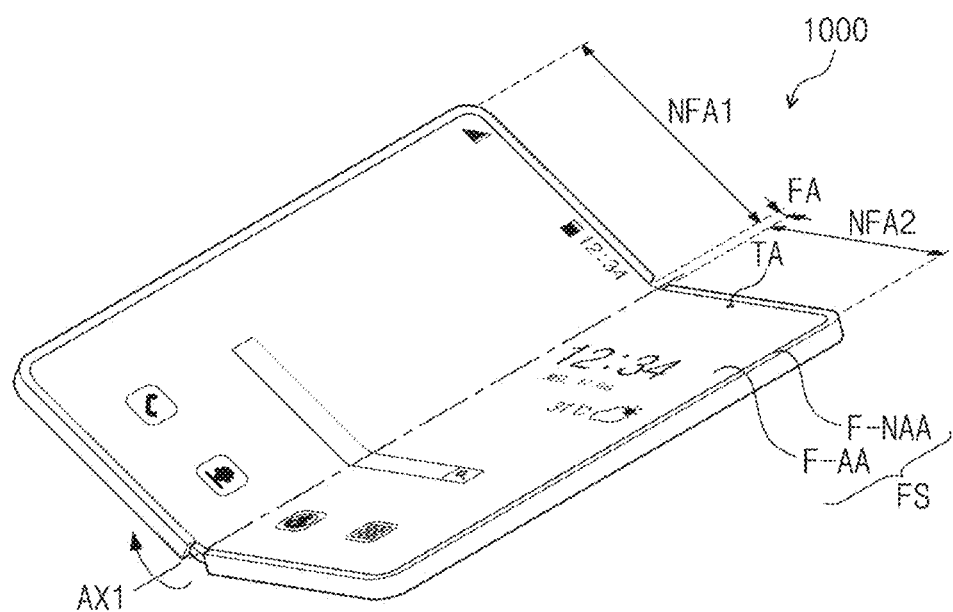
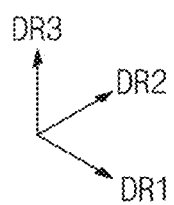

DIGITIZER AND ELECTRONIC DEVICE INCLUDING THE SAME

This application claims priority to Korean Patent Application No. 10-2022-0187128, filed on Dec. 28, 2022, and all the benefits accruing therefrom under 35 U.S.C. § 119, the content of which in its entirety is herein incorporated by reference.

BACKGROUND

The present invention relates to an electronic device including a digitizer, and more particularly, to an electronic device including a digitizer with improved sensitivity.

In the current information society, there is a great emphasis on an electronic device as visual information transmission media. The electronic device is activated with electrical signals applied thereto. The electronic device includes a display device to display images and a digitizer to detect external inputs.

The digitizer of the electronic device may include various sensing coils to be activated with electrical signals. A region where the sensing coils are activated corresponds to external signals.

SUMMARY

An embodiment of the present invention provides an electronic device in which a digitizer for detecting external inputs is improved in folding characteristics.

According to an embodiment of the present invention, an electronic device includes: a display panel that provides an image; and a digitizer below the display panel and including a first non-folding part, a second non-folding part, and a folding part between the first non-folding part and the second non-folding part. The first non-folding part and the second non-folding part are arranged along a first direction. The folding part includes first group holes and second group holes between neighboring first group holes. The folding part is foldable about a folding axis extending in a second direction intersecting the first direction. Each of the first group holes may include holes arranged along the second direction. Each of the second group holes may include holes arranged along the second direction. The digitizer includes: a base layer; first loop coils on the base layer and each including a first part on the first non-folding part, a second part on the second non-folding part, and a third part on the folding part, where the third part surrounds a portion of corresponding holes of the first and second group holes; and second loop coils insulated from the first loop coils and below the base layer. Each of the holes of the first and second group holes extends in the second direction and includes a first end and a second end that are spaced apart from each other in the second direction. The third part includes: first patterns adjacent to the first ends of corresponding holes of the first and second group holes; second patterns adjacent to the second ends of corresponding holes of the first and second group holes; and third patterns that connect corresponding first patterns to corresponding second patterns. Each of the first patterns and the second patterns may have a curvature.

In an embodiment, a maximum width in the second direction between the first part and each of the first patterns may be in a range of about 0.5 millimeters (mm) to about 2 mm.

In an embodiment, the holes may include normal holes that extend along the second direction and cutting holes adjacent to opposite edges of the folding part in the second direction. Each of the cutting holes may have an area less than an area of each of the normal holes. A width in the first direction of each of the holes may be in a range of about 0.1 mm to about 0.5 mm.

In an embodiment, a width in the second direction of each of the normal holes may be in a range of about 4 mm to about 10 mm. A width in the second direction of each of the cutting holes may be in a range of about 0.6 mm to about 3.5 mm. Five or more cutting holes may be defined on each of the opposite edges of the folding part that are spaced apart from each other along the second direction.

In an embodiment, two first patterns included two first loop coils may be disposed between two holes adjacent to each other in the second direction. Two second patterns included in other two first loop coils may be disposed between the two holes adjacent to each other in the second direction.

In an embodiment, a width between the two holes adjacent to each other in the second direction may be in a range of about 0.1 mm to about 0.3 mm.

In an embodiment, two third patterns included in different first loop coils may be between two holes adjacent to each other in the first direction.

In an embodiment, a width between the two holes adjacent to each other in the first direction may be in a range of about 0.1 mm to about 0.3 mm.

In an embodiment, a width in the first direction between the hole adjacent to the first non-folding part and the hole adjacent to the second non-folding part may be in a range of about 5 mm to about 20 mm.

In an embodiment, the electronic device may further include: a first cover layer on the base layer and covering the first loop coils; and a second cover layer below the base layer and covering the second loop coils.

In an embodiment, the base layer, the first cover layer, and the second cover layer may include a matrix including a filler and weave-shaped fiber lines within the matrix.

In an embodiment, the matrix may include at least one selected from epoxy, polyester, polyamide, polycarbonate, polypropylene, polybutylene, and vinylester. The filler may include at least one selected from silica, barium sulphate, sintered tale, barium titanate, titanium oxide, clay, alumina, mica, boehmite, zinc borate, and zinc titanate.

In an embodiment, the first loop coils may include first to fourth coils that are sequentially arranged along the second direction. A first distance in the second direction between the first part included in the first coil and the first part included in the second coil may be the same as a second distance in the second direction between the first part included in the third coil and the first part included in the fourth coil.

In an embodiment, a third distance between the first part included in the second coil and the first part included in the third coil may be greater than the first distance.

In an embodiment, the electronic device may further include an additional base layer on the base layer. The first loop coils may include first to eighth coils that are sequentially arranged along the second direction. In parts of the first to eighth coils on the first non-folding part and the second non-folding part, a distance in the second direction between the first coil and the second coil, a distance in the second direction between the third coil and the fourth coil, a distance in the second direction between the fifth coil and the sixth coil, and a distance in the second direction between the seventh coil and the eighth coil may each be less than a first distance in the first direction between two holes of the holes. The two holes may be adjacent in the first direction. A distance in the second direction between the second coil and the third coil, a distance in the second direction between the fourth coil and the fifth coil, and a distance in the second direction between the sixth coil and the seventh coil may each be greater than the first distance.

In an embodiment, the first coil, the second coil, the fifth coil, and the sixth coil may be on the base layer. The third coil, the fourth coil, the seventh coil, and the eighth coil may be on the additional base layer.

In an embodiment, the first coil, the third coil, the fifth coil, and the seventh coil may be on the base layer. The second coil, the fourth coil, the sixth coil, and the eighth coil may be on the additional base layer.

In an embodiment, the number of the second loop coils disposed on the folding part may be equal to or greater than four.

In an embodiment, the second group holes may each be disposed shifted along the second direction at a certain distance from each of the first group holes.

In an embodiment, the digitizer may be configured to use an electromagnetic resonance ("EMR") method to detect an external input.

BRIEF DESCRIPTION OF DRAWINGS

FIG. 1B illustrates a perspective view showing a folding operation of an electronic device according to an embodiment of the present invention.

DETAILED DESCRIPTION

Figure 1A:
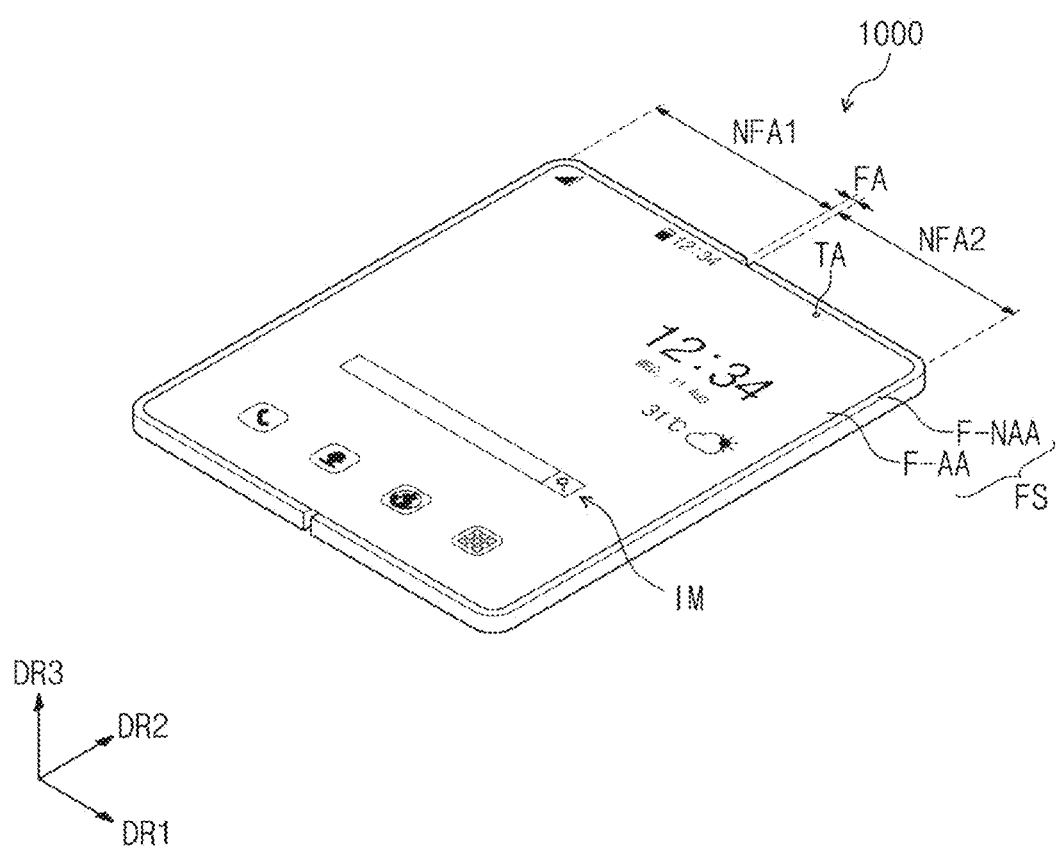
FIG. 1A illustrates a perspective view showing an unfolding state of an electronic device according to an embodiment of the present invention.

In this description, when a certain component (or region, layer, portion, etc.) is referred to as being "on", "connected to", or "coupled to" other component(s), the certain component may be directly on, directly connected to, or directly coupled to the other component(s) or at least one intervening component may be present therebetween.

Like numerals indicate like components. Moreover, in the drawings, thicknesses, ratios, and dimensions of components are exaggerated for effectively explaining the technical contents. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes one or more combinations defined by associated components.

It will be understood that, although the terms "first", "second", etc. may be used herein to describe various components, these components should not be limited by these terms. These terms are only used to distinguish one component from another component. For example, a first component could be termed a second component, and vice versa without departing from the scope of the present invention. Unless the context clearly indicates otherwise, the singular forms are intended to include the plural forms as well.

In addition, the terms "beneath", "lower", "above", "upper", and the like are used herein to describe one component's relationship to other component(s) illustrated in the drawings. The relative terms are intended to encompass different orientations in addition to the orientation depicted in the drawings.

It should be understood that the terms "comprise", "include", "have", and the like are used to specify the presence of stated features, integers, steps, operations, components, elements, or combinations thereof, but do not preclude the presence or addition of one or more other features, integers, steps, operations, components, elements, or combinations thereof.

Unless otherwise defined, all terms used herein including technical and scientific terms have the same meaning generally understood by one of ordinary skilled in the art. Also, terms as defined in dictionaries generally used should be understood as having meaning identical or meaning contextually defined in the art and should not be understood as ideally or excessively formal meaning unless definitely defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. The following will now describe some embodiments of the present invention in conjunction with the accompanying drawings.

Figure 1C:
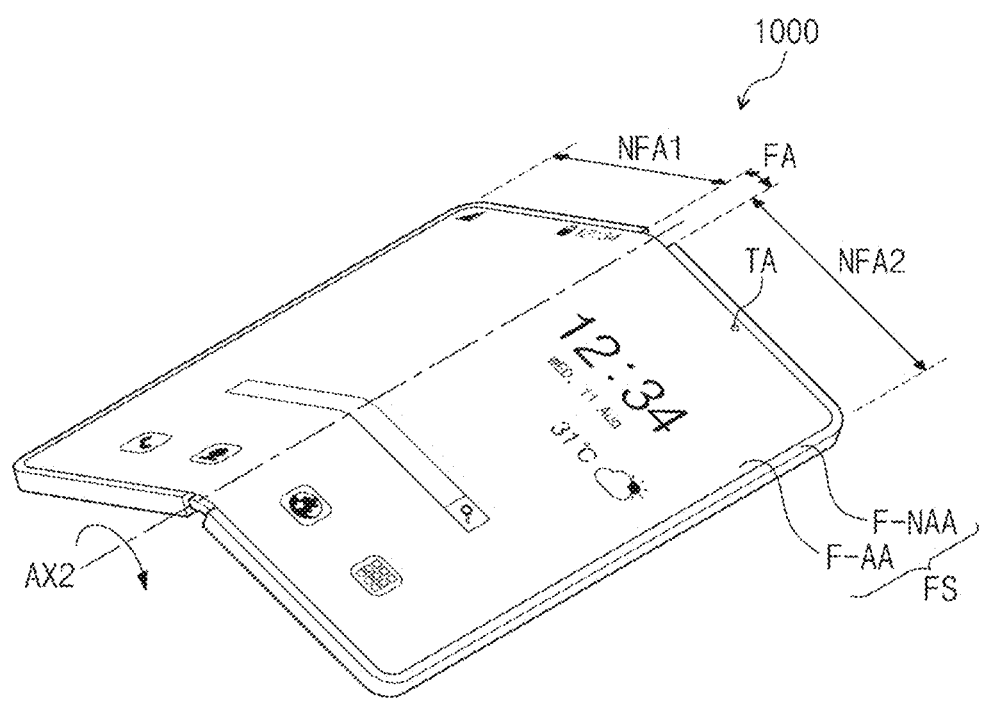
FIG. 1C illustrates a perspective view showing a folding operation of an electronic device according to an embodiment of the present invention.
Figure 1D:
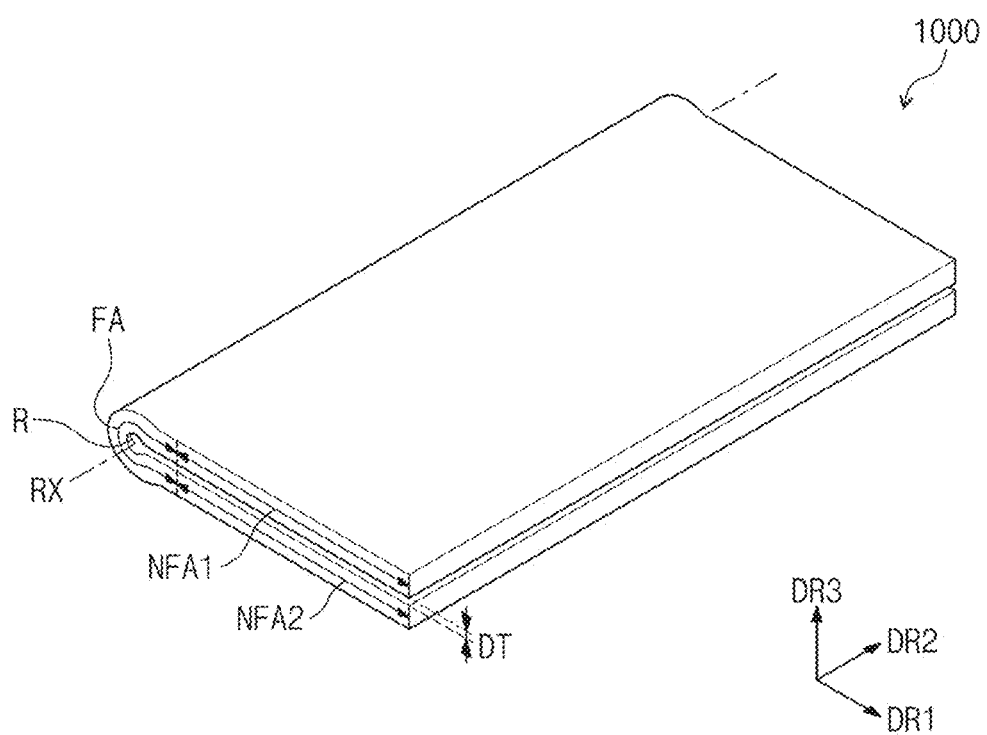
FIG. 1D illustrates a perspective view showing a folding state of an electronic device according to an embodiment of the present invention.
Figure 1E:
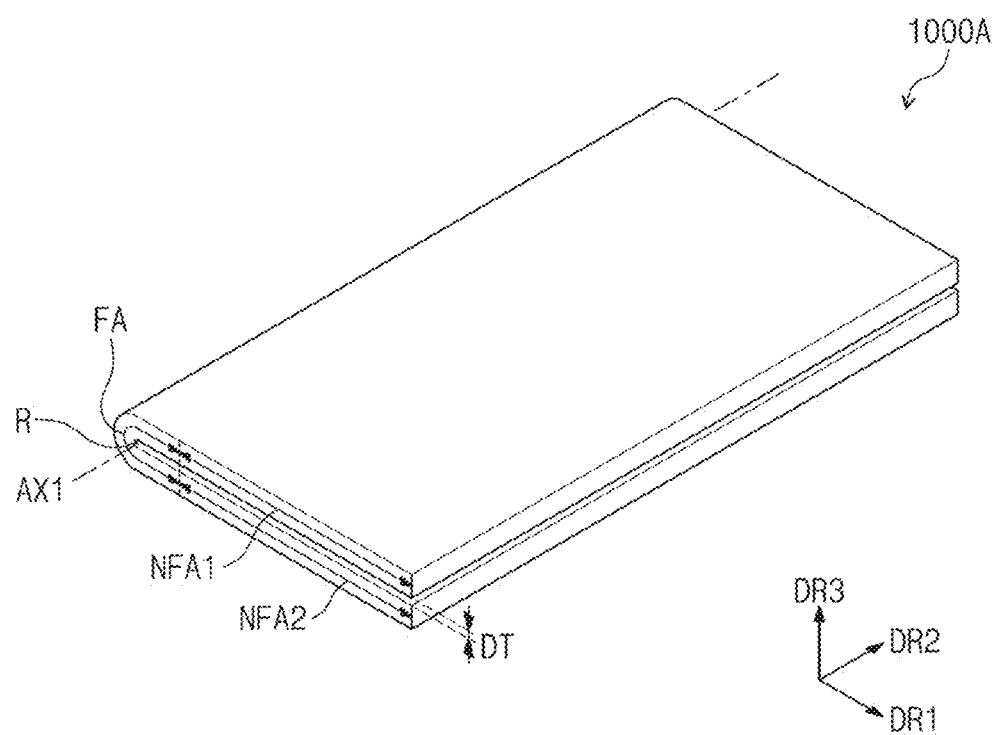
FIG. 1E illustrates a perspective view showing a folding state of an electronic device according to an embodiment of the present invention.

FIG. 1A illustrates a perspective view showing an unfolding state of an electronic device according to an embodiment of the present invention. FIG. 1B illustrates a perspective view showing a folding operation of an electronic device according to an embodiment of the present invention. FIG. 1C illustrates a perspective view showing a folding operation of an electronic device according to an embodiment of the present invention. FIG. 1D illustrates a perspective view showing a folding state of an electronic device according to an embodiment of the present invention. FIG. 1E illustrates a perspective view showing a folding state of an electronic device according to an embodiment of the present invention.

Referring to FIGS. 1A to 1D, an electronic device 1000 according to the present invention may be an apparatus that is activated with electrical signals. The electronic device 1000 may include various embodiments. For example, the electronic device 1000 may include a tablet computer, a laptop computer, a desktop computer, a smart television set, and so forth. In an embodiment, a smart phone is illustrated as an example of the electronic device 1000.

The electronic device 1000 may display an image IM in a third direction DR3 on a display surface FS parallel to each of a first direction DR1 and a second direction DR2. The display surface FS that displays the image IM may correspond to a front surface of the electronic device 1000. The image IM may include not only dynamic images but also static images. FIGS. 1A to 1C depict an internet search bar and a clock icon as examples of the image IM.

According to an embodiment, front and rear surfaces (top and bottom surfaces) of each component are defined based on a direction along which the image IM is displayed in a folding state of the electronic device 1000. The front and rear surfaces may be opposite to each other in the third direction DR3, and a normal direction to each of the front and rear surfaces may be parallel to the third direction DR3.

The electronic device 1000 may detect an external input that is applied from outside. The external input may be a user's input. The user's input may include a part of user's body, an electromagnetic pen, light, heat, or any other various types of external input. When the electronic device 1000 detects an input by an electromagnetic pen, the electronic device 1000 may further include a digitizer driven by electromagnetic resonance (EMR), but the present invention is not limited thereto.

FIG. 1A depicts the electronic device 1000 in an unfolding state. The display surface FS of the electronic device 1000 may include an active region F-AA and a peripheral region F-NAA. The peripheral region F-NAA may be adjacent to the active region F-AA. The peripheral region F-NAA may have an optical transmittance less than an optical transmittance of the active region F-AA and may have a certain color.

According to an embodiment, the peripheral region F-NAA may surround the active region F-AA. Therefore, a shape of the active region F-AA may be substantially defined by the peripheral region F-NAA. This, however, is illustrated by way of example, and the peripheral region F-NAA may be disposed adjacent to only one side of the active region F-AA or may be omitted.

The display surface FS may further include a signal transmission region TA. It is illustrated by way of example that the signal transmission region TA is included in the active region F-AA, but the present invention is not limited thereto, and the signal transmission region TA may be included in the peripheral region F-NAA or may be surrounded by each of the active region F-AA and the peripheral region F-NAA in another embodiment.

The signal transmission region TA may have a transmittance greater than the transmittance of the active region F-AA and the peripheral region F-NAA. Natural light, visible light, or infrared light may migrate toward the signal transmission region TA.

The electronic device 1000 may further include a sensor that uses either visible light that passes through the signal transmission region TA to capture an external image or infrared light to determine proximity of an external substance. The sensor may overlap the signal transmission region TA. Therefore, the electronic device 1000 may be provided with a sensor whose reliability is improved.

Referring to FIG. 1B, the electronic device 1000 according to an embodiment may be a foldable electronic device. For example, the electronic device 1000 may fold about an imaginary first folding axis AX1 that extends in the second direction DR2. The first folding axis AX1 may be formed on the display surface FS. When the electronic device 1000 folds, components included in the electronic device 1000 may fold corresponding to the folding of the electronic device 1000.

The electronic device 1000 may include a folding region FA that folds about the first folding axis AX1, and may also include a first non-folding region NFA1 and a second non-folding region NFA2 that are spaced apart in the first direction DR1 from each other across the folding region FA.

The electronic device 1000 may fold about the first folding axis AX1 in an in-folding fashion such that the first non-folding region NFA1 and the second non-folding region NFA2 may fold in a direction to face each other.

Referring to FIG. 1C, the electronic device 1000 may fold about a second folding axis AX2 in an out-folding fashion such that the first non-folding region NFA1 and the second non-folding region NFA2 may fold in a direction to stand opposite to each other. The second folding axis AX2 may be formed on a surface opposite to the display surface FS.

In this description, the term "first mode" may be defined to indicate a state where the electronic device 1000 unfolds, and the term "second mode" may be defined to indicate a state where the electronic device 1000 folds in the in-folding fashion as illustrated in FIG. 1B or in the out-folding fashion as illustrated in FIG. 1C.

The electronic device 1000 according to an embodiment may fold in only one of the in-folding fashion and the out-folding fashion about the folding axes AX1 and AX2 that extend along the same line. The present invention, however, is not limited thereto, and the electronic device 1000 may fold about one folding axis in the in-folding fashion or the out-folding fashion in another embodiment.

Referring to FIG. 1D, when the electronic device 1000 in-folds according to an embodiment, at least a portion of the folding region FA may have a certain curvature. The folding region FA may have a curvature center RX inside the folding region FA, and the electronic device 1000 may fold to have a certain curvature radius R from the curvature center RX. According to an embodiment, the curvature radius R may be greater than an interval DT between the first non-folding region NFA1 and the second non-folding region NFA2. Therefore, the first and second non-folding regions NFA1 and NFA2 of the electronic device 1000 may fold thinly in the second mode.

Referring to FIG. 1E, an electronic device 1000A according to an embodiment may in-fold with a certain curvature radius R. In this case, an interval DT between a portion that extends from the folding region FA toward the first non-folding region NFA1 and a portion that extends from the folding region FA toward the second non-folding region NFA2 may be constant along the first direction DR1, but the present invention is not limited thereto.

Figure 2:
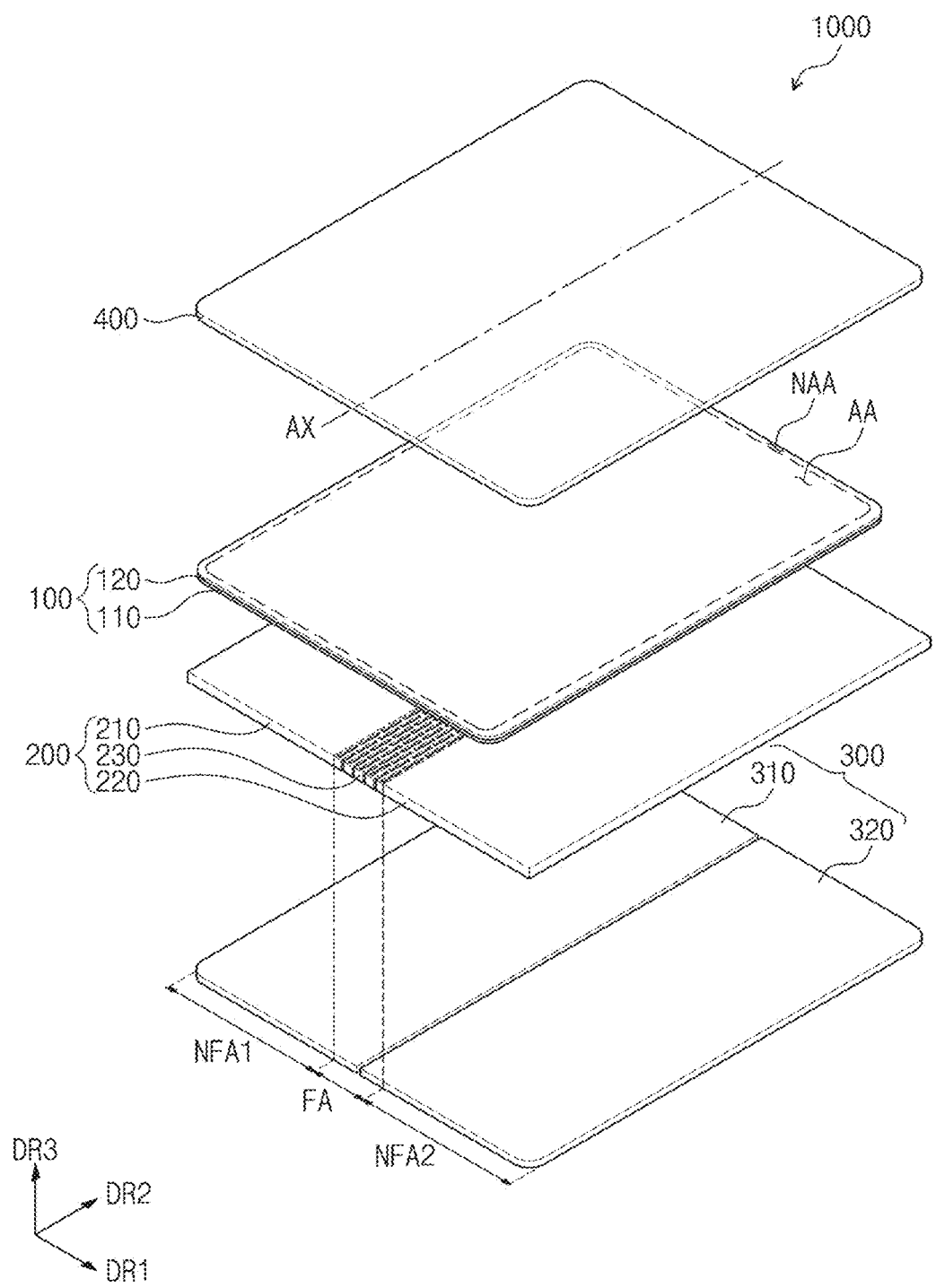
FIG. 2 illustrates an exploded perspective view showing an electronic device according to an embodiment of the present invention.
Figure 3:
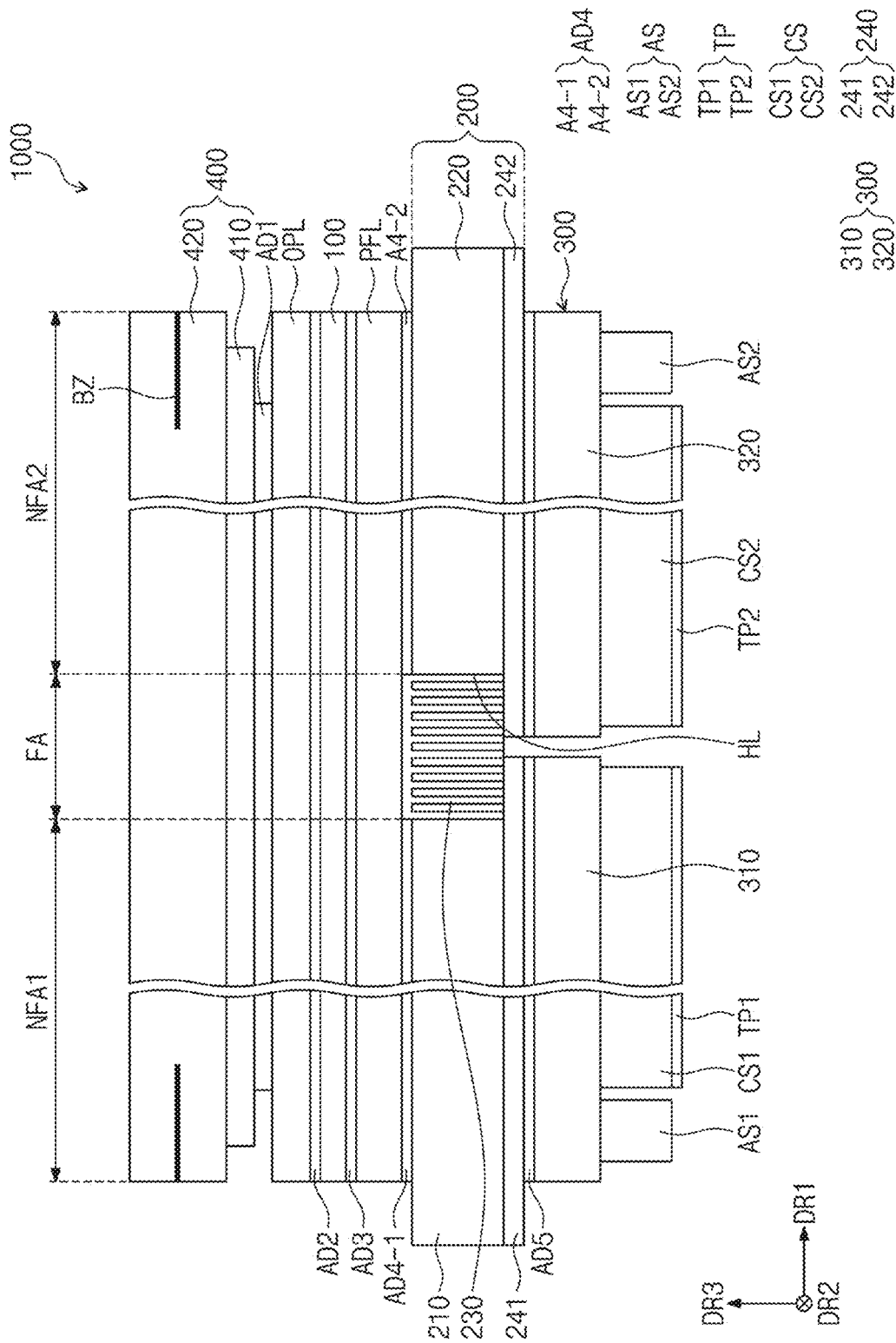
FIG. 3 illustrates a cross-sectional view showing an electronic device according to an embodiment of the present invention.

FIG. 2 illustrates an exploded perspective view showing an electronic device according to an embodiment of the present invention. FIG. 3 illustrates a cross-sectional view showing an electronic device according to an embodiment of the present invention. FIG. 2 depicts only some of components included in the electronic device 1000.

Referring to FIGS. 2 and 3, the electronic device 1000 may include a display module 100, a digitizer 200, a cushion layer 300, and a window 400. For example, as illustrated in FIG. 3, the electronic device 1000 may include a plurality of adhesion layers AD1 to AD5, upper functional layers disposed between the display module 100 and the window 400, and lower functional layers disposed below the digitizer 200.

The subsequently described first to fifth adhesion layers AD1 to AD5 may include one of an optical clear adhesive ("OCA"), an optical clear resin ("OCR"), and a pressure sensitive adhesive ("PSA").

According to the present invention, the display module 100 may be flexible. The display module 100 may include an active region AA that corresponds to the active region F-AA of the electronic device 1000 depicted in FIG. 1A, and may also include a peripheral region NAA that corresponds to the peripheral region F-NAA of the electronic device 1000 depicted in FIG. 1A.

The display module 100 may include a display panel 110 that displays an image and an input sensor 120 that detects an external input. The display panel 110 may be an emissive display panel, but the present invention is not limited thereto.

For example, the display panel 110 may be an organic light-emitting display panel or a quantum-dot light-emitting display panel. A light-emitting element of the organic light-emitting display panel 110 may include an organic light-emitting material. A light-emitting element of the inorganic light-emitting display panel 110 may include a quantum-dot or a quantum-rod. The display panel 110 according to an embodiment may include a micro-LED element and/or a nano-LED element, but the present invention is not particularly limited thereto.

The display panel 110 may include a plurality of pixels each including one of the light-emitting elements discussed above. Emission layers included in each of the light-emitting elements may be disposed on the active region AA and may emit certain colors. When the emission layer is provided in plural, the light-emitting elements may correspond to the emission layers. Alternatively, when the emission layer is provided as a single layer, there may further be included color filters or color conversion members disposed on the emission layer. The peripheral region NAA may be provided thereon with conductive patterns for driving the light-emitting elements.

The input sensor 120 may be disposed on the display panel 110. The input sensor 120 may operate in a capacitive manner. The input sensor 120 may detect a position and/or strength of a user's hand over a front surface of the active region F-AA. The input sensor 120 may include sensing electrodes that are insulated from each other, routing lines connected to corresponding sensing electrodes, and at least one sensing dielectric layer.

According to an embodiment, a series of processes may be employed to form the input sensor 120 on the display panel 110. In this case, it may be expressed that the input sensor 120 is directly disposed on the display panel 110. The phrase "directly disposed" may mean that no third component is disposed between the input sensor 120 and the display panel 110. For example, no adhesive member may be separately disposed between the input sensor 120 and the display panel 110.

The present invention, however, is not limited thereto, and the input sensor 120 may be provided as a separate module that is coupled through an adhesion layer to the display panel 110 in another embodiment.

The digitizer 200 may be disposed below the display module 100. The digitizer 200 according to the present invention may detect an input by an electromagnetic pen. The digitizer 200 may be driven by electromagnetic resonance (EMR).

The digitizer 200 according to the present invention may be disposed below the display module 100 not only to detect an input by an electromagnetic pen but also to support the display module 100.

The digitizer 200 according to an embodiment may include a first non-folding part 210, a second non-folding part 220, and a folding part 230. In addition, the digitizer 200 may further include a shield layer 240.

The first non-folding part 210 of the digitizer 200 may overlap at least a portion of the first non-folding region NFA1. The second non-folding part 220 of the digitizer 200 may overlap at least a portion of the second non-folding region NFA2. The folding part 230 may overlap the folding region FA. Therefore, the folding part 230 may be disposed between the first non-folding part 210 and the second non-folding part 220. Holes HL may be defined on the folding part 230 according to the present invention. Each of the holes HL may be formed to penetrate in the third direction DR3 from a front surface along a rear surface of the digitizer 200 that overlaps the folding part 230 in a plan view. The holes HL may be disposed spaced apart from each other along the first direction DR1 and the second direction DR2.

The shield layer 240 may include a first shield layer 241 and a second shield layer 242. The first shield layer 241 may overlap the first non-folding part 210 and a portion of the folding part 230, and the second shield layer 242 may overlap the second non-folding part 220 and another portion of the folding part 230 in a plan view. The first shield layer 241 and the second shield layer 242 may be spaced apart from each other along the first direction DR1 in the folding region FA. The present invention, however, is not limited thereto, and the shield layer 240 may be disposed on an entirety of the folding region FA to cover the holes HL in another embodiment.

In an embodiment, the shield layer 240 may include metal. For example, the shield layer 240 may include magnetic metal powder ("MMP"). However, no limitation is imposed on the material of the shield layer 240, and the shield layer 240 may include one of stainless steel, invar, and permalloy or nickel-iron alloys.

According to an embodiment, when the electronic device 1000 repeatedly folds in the first mode and the second mode, a changed shape of the display module 100 may be supported by the digitizer 200 and a shape of the display module 100 may be changed to correspond to a shape of the digitizer 200.

The digitizer 200 according to an embodiment may include loop coils and one or more base layers on which the loop coils are disposed. Each of the base layers may include a matrix and a reinforced fiber composite material. The reinforced fiber may include one of carbon fiber and glass fiber. The matrix may include a polymer resin. The matrix may include a thermoplastic resin.

The digitizer 200 according to the present invention may serve not only as a protection member to protect the display module 100, but as a sensing member to detect an input by an electromagnetic pen.

The cushion layer 300 may be disposed below the digitizer 200. The cushion layer 300 may protect the display module 100 against impact transmitted from below the display module 100. The cushion layer 300 may include foaming foam or sponge. The foaming foam may include urethane foam or thermoplastic polyurethane foam. When the cushion layer 300 includes foaming foam, a barrier film may be added as a base layer of the cushion layer 300 and a foaming agent may be foamed on the barrier film to form the cushion layer 300.

The cushion layer 300 may include a first cushion layer 310 and a second cushion layer 320. The first cushion layer 310 may overlap the first non-folding part 210 and a portion of the folding part 230 in a plan view. The second cushion layer 320 may overlap the second non-folding part 220 and another portion of the folding part 230 in a plan view. The first cushion layer 310 and the second cushion layer 320 may be spaced apart from each other along the first direction DR1 in the folding region FA.

The first cushion layer 310 may be coupled to the first shield layer 241 through a portion of the fifth adhesion layer AD5, and the second cushion layer 320 may be coupled to the second shield layer 242 through another portion of the fifth adhesion layer AD5. The fifth adhesion layer AD5 may include an opening that overlaps at least a portion of the folding part 230 in a plan view.

When the electronic device 1000 is in the first mode, the first cushion layer 310 and the second cushion layer 320 may prevent introduction of foreign substances into the holes HL defined in the folding part 230. Even though the folding part 230 folds with a certain curvature when the electronic device 1000 is in the second mode, as the first cushion layer 310 and the second cushion layer 320 are spaced apart from each other on a region that overlaps the folding part 230 in a plan view, the digitizer 200 may be easily changed in shape.

The window 400 may be disposed on the display module 100. The window 400 may include a first layer 410, a second layer 420, and a bezel pattern BZ. The window 400 may include an optically transparent material to allow passage of light provided from the display module 100. The window 400 may provide the display surface (see FS of FIG. 1A) of the electronic device 1000.

The window 400 may be formed of a soft material. Therefore, the window 400 may fold or unfold about a folding axis AX. For example, in accordance with operations of the first mode and the second mode, a shape of the window 400 may be changed corresponding to a shape of the digitizer 200.

The first layer 410 according to an embodiment may include a thin glass or a synthetic resin film. When the first layer 410 includes a thin glass, the first layer 410 may have a thickness of equal to or less than about 100 micrometers (μm). For example, the first layer 410 may have a thickness of about 30 μm, but the present invention is not limited thereto.

When the first layer 410 includes a synthetic resin film, the first layer 410 may include a polyimide ("PI") film or a polyethylene terephthalate ("PET") film.

The first layer 410 may have a multi-layered structure or a single-layered structure. For example, the first layer 410 may include either a plurality of synthetic resin films that are coupled to each other through an adhesive or a synthetic resin film that is coupled to a glass substrate through an adhesive.

The second layer 420 may be disposed on the first layer 410. The second layer 420 may include a material whose modulus is relatively less than the modulus of the first layer 410. For example, the second layer 420 may be a film including an organic material. The second layer 420 may have a thickness relatively greater than the thickness of the first layer 410. Therefore, the second layer 420 may protect a top surface of the first layer 410.

The second layer 420 may include one or more functional layers. The functional layers may include one or more of a window protection layer, an antifingerprint layer, and an antireflection layer.

The window 400 may not only allow images from the display module 100 to pass therethrough, but may also alleviate external impact, and thus the display module 100 may be prevented from fracture or malfunction caused by external impact.

An optical layer OPL may be disposed between the display module 100 and the window 400. The optical layer OPL may be coupled through the first adhesion layer AD1 to the window 400, and may be coupled through the second adhesion layer AD2 to the display module 100.

The optical layer OPL may reduce a reflectance of external light. The optical layer OPL may include a stretchable synthetic resin film. For example, the optical layer OPL may be provided in the form of a polyvinyl alcohol ("PVA") film dyed with an iodine compound. Alternatively, the optical layer OPL may include a color filter. The optical layer OPL may include various layers as long as the layers can reduce a reflectance of external light, but the present invention is not limited to a certain embodiment.

A panel protection layer PFL may be disposed between the display module 100 and the digitizer 200. The panel protection layer PFL and the display module 100 may be coupled to each other through the third adhesion layer AD3. The panel protection layer PFL may be disposed below the display module 100 to protect a lower portion of the display module 100. The panel protection layer PFL may include a flexible plastic material. For example, the panel protection layer PFL may include polyethylene terephthalate.

The digitizer 200 and the panel protection layer PFL may be coupled to each other through the fourth adhesion layer AD4. The fourth adhesion layer AD4 may include a first part AD4-1 and a second part AD4-2. The first part AD4-1 and the second part AD4-2 may be spaced apart from each other across the folding region FA.

The first part AD4-1 may couple the first non-folding part 210 to a portion of the panel protection layer PFL, and the second part AD4-2 may couple the second non-folding part 220 to another portion of the panel protection layer PFL.

The electronic device 1000 may further include a metal plate CS, a dielectric layer TP, and a step compensation member AS that are disposed below the cushion layer 300. The metal plate CS may absorb external impact to protect the display module 100. The metal plate CS may include stainless steel. The metal plate CS may include a first metal layer CS1 and a second metal layer CS2. The first metal layer CS1 may be coupled to the first cushion layer 310 through one portion of an additional adhesion layer, and the second metal layer CS2 may be coupled to the second cushion layer 320 through another portion of the additional adhesion layer.

The dielectric layer TP may be disposed below the metal plate CS. The dielectric layer TP may prevent introduction of static electricity into the metal plate CS. The dielectric layer TP may be a dielectric film. The dielectric layer TP may be provided as a first dielectric layer TP1 and a second dielectric layer TP2 that are coupled to the first metal layer CS1 and the second metal layer CS2, respectively.

The step compensation member AS may be coupled below the cushion layer 300. The step compensation member AS may be a double-sided tape or a dielectric film. The step compensation member AS may be provided as a first step compensation member AS1 and a second step compensation member AS2 that are coupled to the first cushion layer 310 and the second cushion layer 320, respectively.

The electronic device 1000 according to an embodiment may not include one of the metal plate CS, the dielectric layer TP, and the step compensation member AS, but the present invention is not limited to a certain embodiment.

Figure 4:
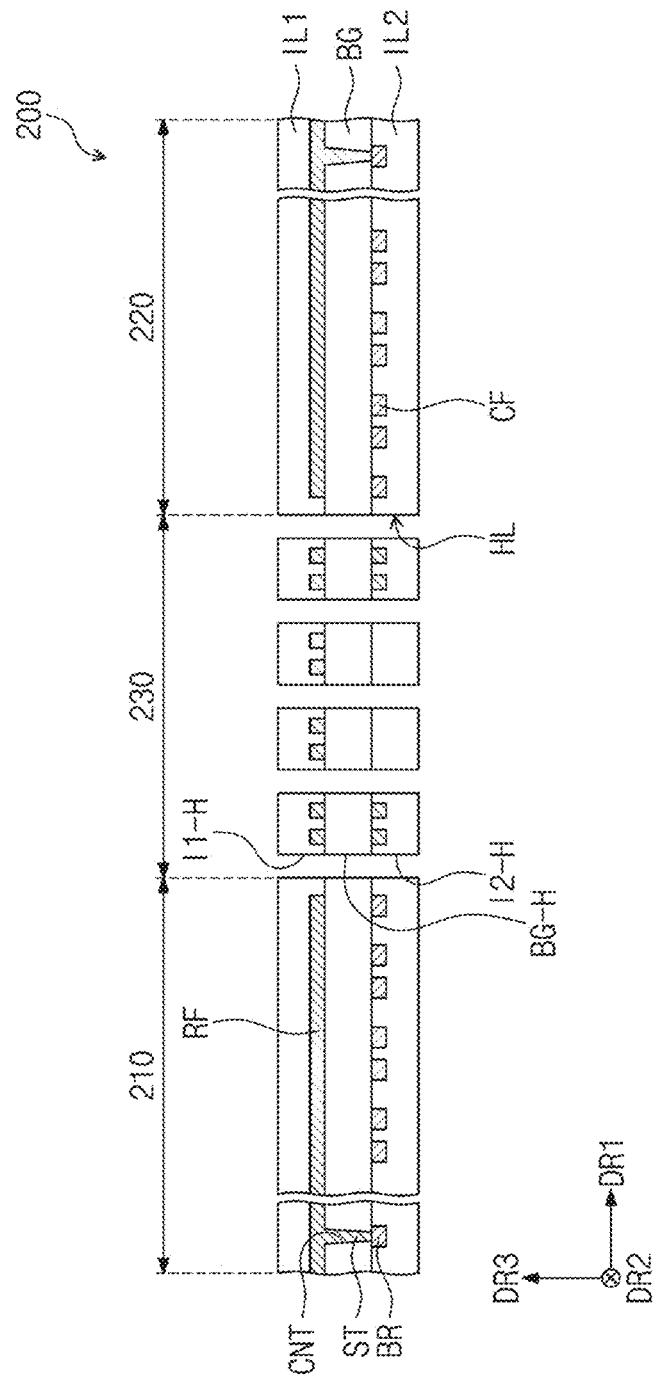
FIG. 4 illustrates a cross-sectional view showing a digitizer according to an embodiment of the present invention.
Figure 5A:
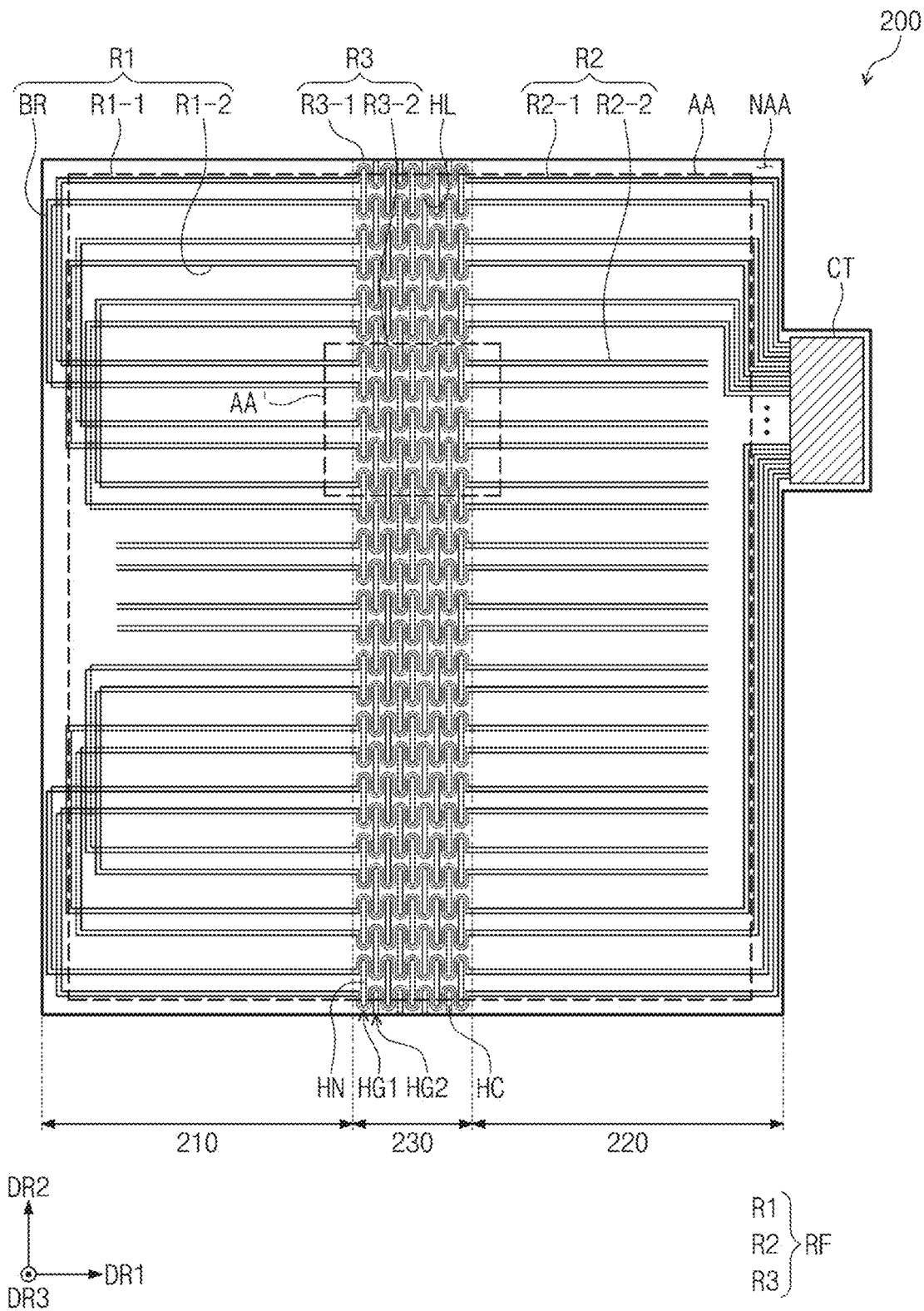
FIG. 5A illustrates a plan view showing a digitizer according to an embodiment of the present invention.
Figure 5B:
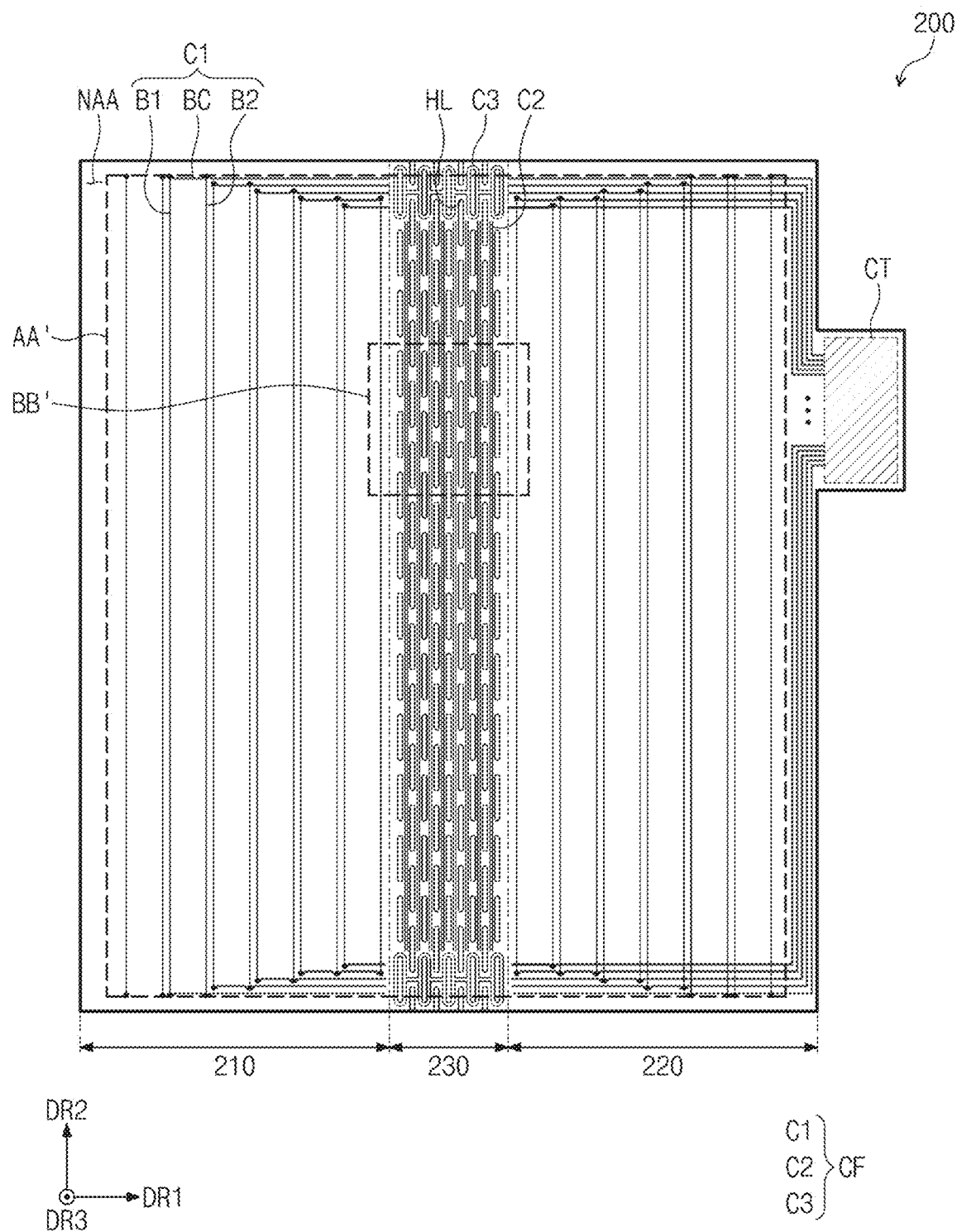
FIG. 5B illustrates a plan view showing a digitizer according to an embodiment of the present invention.
Figure 6:
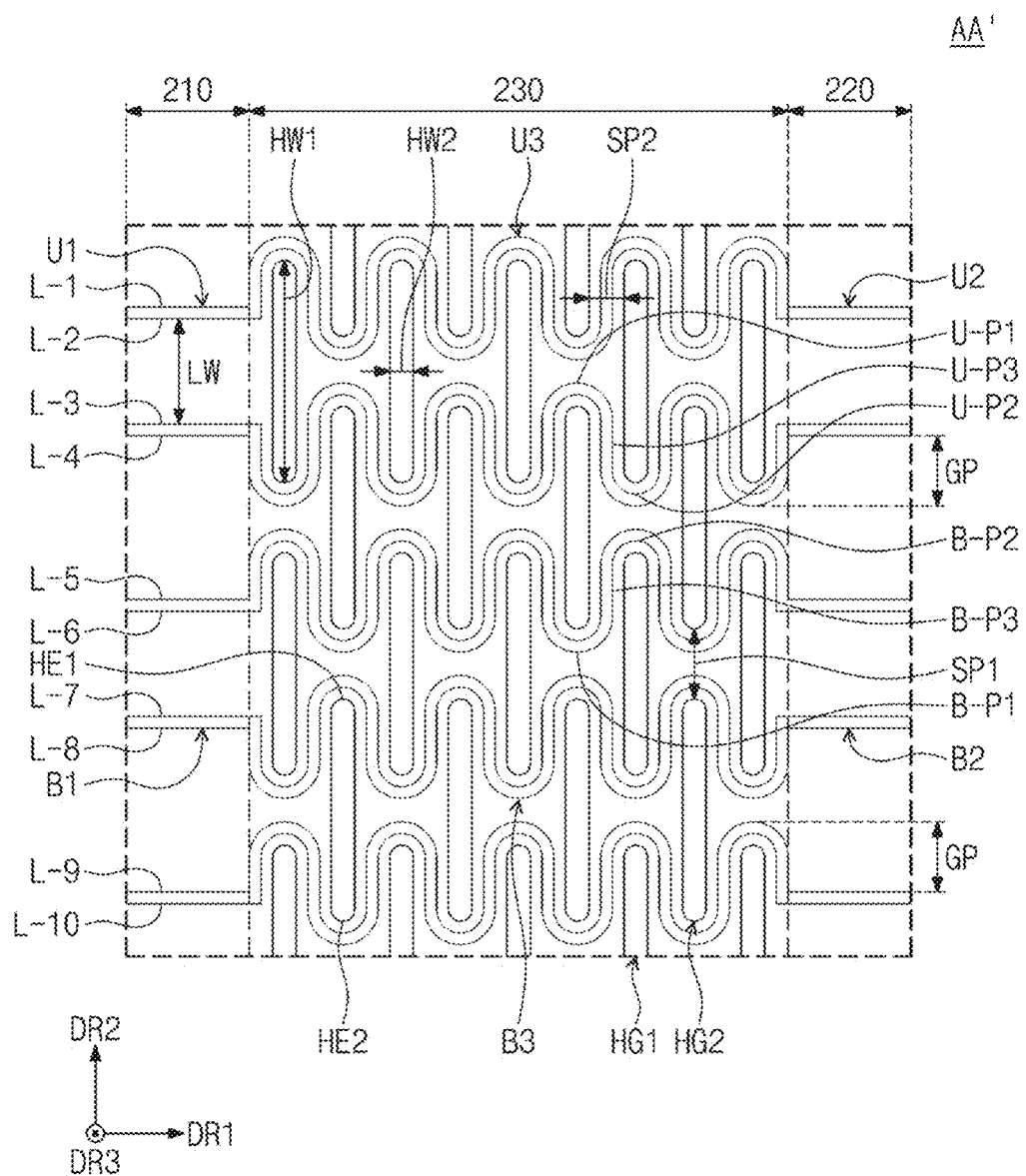
FIG. 6 illustrates an enlarged plan view showing section AA' of FIG. 5A.
Figure 7:
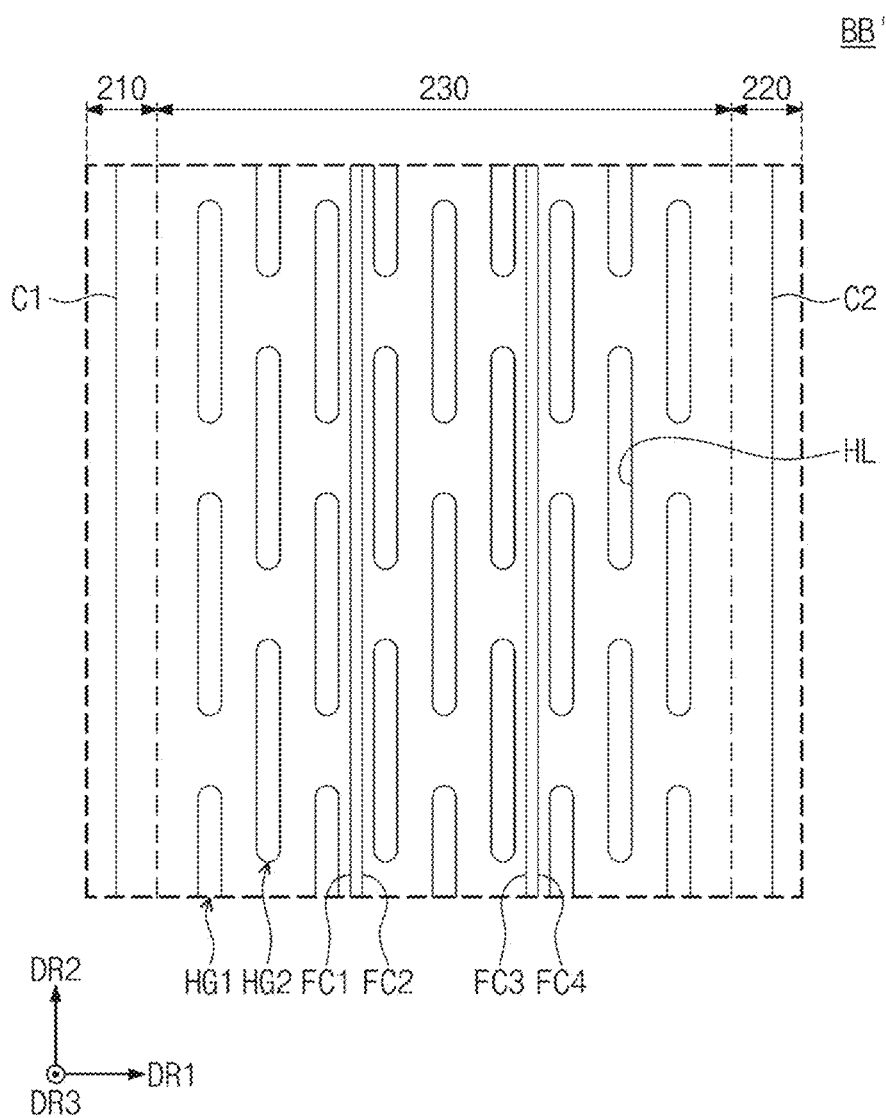
FIG. 7 illustrates an enlarged plan view showing section BB' of FIG. 5B.

FIG. 4 illustrates a cross-sectional view showing a digitizer according to an embodiment of the present invention. FIG. 5A illustrates a plan view showing a digitizer according to an embodiment of the present invention. FIG. 5B illustrates a plan view showing a digitizer according to an embodiment of the present invention. FIG. 6 illustrates an enlarged plan view showing section AA' of FIG. 5A. FIG. 7 illustrates an enlarged plan view showing section BB' of FIG. 5B.

Referring to FIG. 4, the digitizer 200 according to an embodiment may include a base layer BG, a first cover layer IL1, a second cover layer IL2, first loop coils RF, and second loop coils CF.

The base layer BG may be a foundation layer on which the loop coils RF and CF are disposed. The base layer BG according to an embodiment may include base holes BG-H defined to penetrate from front to rear surfaces of the base layer BG. The front surface of the base layer BG may be defined as a surface that faces a rear surface of the display module 100. The first loop coils RF may be disposed on the front surface of the base layer BG. The second loop coils CF may be disposed on the rear surface of the base layer BG.

The first cover layer IL1 may be disposed on the front surface of the base layer BG to cover the first loop coils RF. The first cover layer IL1 may include first cover holes I1-H defined to penetrate front and rear surfaces thereof.

The second cover layer IL2 may be disposed on the rear surface of the base layer BG to cover the second loop coils CF. The second cover layer IL2 may include second cover holes I2-H defined to penetrate front and rear surfaces thereof. Each of the holes HL defined on the folding part 230 may be formed to include a corresponding base hole BG-H, a corresponding first cover hole I1-H, and a corresponding second cover hole I2-H that are arranged along the third direction DR3.

One of the first loop coils RF that is disposed on an outer portion of either the first non-folding part 210 or the second non-folding part 220 may be connected to a bridge pattern BR disposed on the rear surface of the base layer BG through a connection pattern ST disposed in a contact hole CNT. This configuration may correspond to a connection relationship at an intersection between different ones of the first loop coils RF which will be discussed in FIG. 5A.

According to an embodiment of the present invention, a portion of the first loop coils RF and the second loop coils CF may be disposed on the folding part 230. The coils disposed on the folding part 230 may be disposed between corresponding holes HL. According to an embodiment of the present invention, as the folding part 230 includes loop coils disposed thereon, the digitizer 200 may have improved sensitivity on the folding part 230.

In addition, the digitizer 200 according to an embodiment may be configured such that loop coils may be disposed on the folding part 230, and thus the foldable electronic device (see 1000 of FIG. 1A) may be provided with the digitizer 200 of unitary type. Therefore, compared to an electronic device including a separate type digitizer in which separate digitizers are correspondingly disposed on the non-folding parts 210 and 220, the electronic device (see 1000 of FIG. 1A) may not include a circuit board for connecting separate digitizers to each other and thus may have reduced costs and simplified components.

Referring to FIGS. 5A and 5B, the digitizer 200 may include an active region AA and a peripheral region NAA. The active region AA may be defined as a region to detect an input by an electromagnetic pen, and the peripheral region NAA may be defined as a region on which bridge patterns are disposed to allow each of the loop coils RF and CF to constitute a loop. The digitizer 200 may include a plurality of loop coils RF and CF and a connector CT. The active region AA may include bridge patterns that allow each of the loop coils RF and CF to constitute a loop, but the present invention is not limited to a certain embodiment.

Each of the first loop coils RF may include a first part R1, a second part R2, and a third part R3 that are connected to each other. The first part R1 may be disposed on the first non-folding part 210, the second part R2 may be disposed on the second non-folding part 220, and the third part R3 may be disposed on the folding part 230.

According to an embodiment, the third part R3 disposed on the folding part 230 may have a line-width the same as or less than the line-width of each of the first part R1 and the second part R2 disposed on the first non-folding part 210 and the second non-folding part 220.

The first part R1 may include a 1-$1^{st}$ pattern R1-1, a 1-$2^{nd}$ pattern R1-2, and a bridge pattern BR.

The 1-$1^{st}$ pattern R1-1 and the 1-$2^{nd}$ pattern R1-2 may be disposed on the active region AA of the first non-folding part 210. The 1-$1^{st}$ pattern R1-1 and the 1-$2^{nd}$ pattern R1-2 may each extend in the first direction DR1, and may be arranged spaced apart from each other along the second direction DR2.

The bridge pattern BR may be disposed on the peripheral region NAA of the first non-folding part 210. The bridge pattern BR may be connected to an end of the 1-$1^{st}$ pattern R1-1 and an end of the 1-$2^{nd}$ pattern R1-2. The bridge pattern BR may be located on a different layer from a layer of the 1-$1^{st}$ pattern R1-1 and the 1-$2^{nd}$ pattern R1-2. Therefore, different first loop coils RF may be disposed in a loop shape. The bridge pattern BR according to an embodiment may correspond to the bridge pattern BR discussed in FIG. 4. The present invention, however, is not limited thereto, and the bridge pattern BR may be disposed on the active region AA of the first non-folding part 210 in another embodiment.

The second part R2 may include a 2-$1^{st}$ pattern R2-1 and a 2-$2^{nd}$ pattern R2-2.

The 2-$1^{st}$ pattern R2-1 and the 2-$2^{nd}$ pattern R2-2 may be disposed on the active region AA of the second non-folding part 220. The 2-$1^{st}$ pattern R2-1 and the 2-$2^{nd}$ pattern R2-2 may each extend in the first direction DR1, and may be arranged spaced apart from each other along the second direction DR2.

The 2-$1^{st}$ pattern R2-1 and the 1-$1^{st}$ pattern R1-1 may be disposed side by side along the first direction DR1 across the folding part 230, and the 2-$2^{nd}$ pattern R2-2 and the 1-$2^{nd}$ pattern R1-2 may be disposed side by side along the first direction DR1 across the folding part 230. Each of the 2-1$^{st}$ pattern R2-1 and the 2-2$^{nd}$ pattern R2-2 may extend from the active region AA toward the peripheral region NAA of the second non-folding part 220, thereby being connected to the connector CT.

The third part R3 may be disposed on the folding part 230. The third part R3 may include a 3-1$^{st}$ pattern R3-1 and a 3-2$^{nd}$ pattern R3-2. The 3-1$^{st}$ pattern R3-1 and the 3-2$^{nd}$ pattern R3-2 may surround a portion of corresponding ones of the holes HL. The 3-1$^{st}$ pattern R3-1 and the 3-2$^{nd}$ pattern R3-2 may be arranged spaced apart from each other along the second direction DR2.

The 3-1$^{st}$ pattern R3-1 may be connected to another end of the 1-1$^{st}$ pattern R1-1 and another end of the 2-1$^{st}$ pattern R2-1. Therefore, the 3-1$^{st}$ pattern R3-1 may connect to each other the 1-1$^{st}$ pattern R1-1 and the 2-1$^{st}$ pattern R2-1 that are spaced apart from each other across the folding part 230.

The 3-2$^{nd}$ pattern R3-2 may be connected to another end of the 1-2$^{nd}$ pattern R1-2 and another end of the 2-2$^{nd}$ pattern R2-2. Therefore, the 3-2$^{nd}$ pattern R3-2 may connect to each other the 1-2$^{nd}$ pattern R1-2 and the 2-2$^{nd}$ pattern R2-2 that are spaced apart from each other across the folding part 230.

The holes HL according to an embodiment may be classified into first group holes HG1 and second group holes HG2. Each of the holes HL may extend along the second direction DR2.

Each of the first group holes HG1 may include the holes HL that are arranged in the second direction DR2. The first group holes HG1 may be spaced apart from each other along the first direction DR1. The second group holes HG2 and the first group holes HG1 may be alternately arranged along the first direction DR1. Therefore, one second group hole HG2 may be disposed between two neighboring first group holes HG1. Each of the second group holes HG2 may include the holes HL that are arranged in the second direction DR2.

According to an embodiment, the second group holes HG2 may be shifted along the second direction DR2 at a certain distance from the first group holes HG1.

The holes HL according to an embodiment may include normal holes HN and cutting holes HC. The cutting holes HC may each have an area less than an area of each of the normal holes HN in a plan view. The cutting holes HC may be defined on opposite ends of the folding part 230 in the second direction DR2. According to an embodiment, it is illustrated that the cutting holes HC are disposed only on opposite ends of the second group holes HG2, but the present invention is not limited thereto. In another embodiment, the cutting holes HC may be provided on first ends of the first group holes HG1 and second ends of the second group holes HG2.

According to an embodiment, a width of each of the cutting holes HC in the second direction DR2 may range from about 0.6 mm to about 3.5 mm. When the width is less than about 0.6 mm, since the cutting holes HC may each have an area too much less than an area of each of the normal holes HN, user's recognition failure may occur, and when the width is greater than about 3.5 mm, there may be a reduction in sensing performance on a region where there are coils surrounding the cutting holes HC.

Five or more cutting holes HC may be arranged in the first direction DR1 on each of opposite ends of the folding part 230 in the second direction DR2.

Referring to FIG. 5B, the second loop coils CF may include a first part C1, a second part C2, and a third part C3. The first part C1 may be disposed on the first non-folding part 210 and the second non-folding part 220, and the second part C2 and the third part C3 may be disposed on the folding part 230.

The first part C1 may include a first pattern C1-1, a second pattern C1-2, and a bridge pattern BC that are connected to each other.

The first pattern C1-1 and the second pattern C1-2 may each extend in the second direction DR2, and may be arranged spaced apart from each other along the first direction DR1. A portion of each of the first pattern C1-1 and the second pattern C1-2 may extend from the active region AA toward the peripheral region NAA. The bridge pattern BC may be connected to at least one of opposite ends of each of the first pattern C1-1 and the second pattern C1-2 that extend toward the peripheral region NAA.

The bridge pattern BC may extend along the peripheral region NAA to be connected to the connector CT.

The second part C2 may be disposed on the active region AA of the folding part 230. The second part C2 may extend along the second direction DR2, while running across the holes HL. According to the present invention, as the first and second loop coils RF and CF include coil disposed on the folding part 230, the folding part 230 may also detect an input by an electromagnetic pen. Therefore, the digitizer 200 may increase in sensing performance.

The third part C3 may be disposed on the peripheral region NAA of the folding part 230. When the first pattern C1-1 of the first part C1 is disposed on the first non-folding part 210, and when the second pattern C1-2 of the first part C1 is disposed on the second non-folding part 220, the third part C3 may be a pattern that connects the first pattern C1-1 disposed on the first non-folding part 210 to the second pattern C1-2 disposed on the second non-folding part 220.

According to an embodiment, the first loop coils RF may be called "sensing coils", and the second loop coils CF may be called "driving coils". When current flows through the second loop coils CF, magnetic flux lines may be induced between the second loop coils CF and the first loop coils RF. The first loop coils RF may detect an induced electromagnetic force released from an electromagnetic pen and may output the induced electromagnetic force as a sensing signal to the first loop coils RF. The present invention, however, is not limited thereto, and the first loop coils RF may be driving coils, and the second loop coils CF may be sensing coils in another embodiment.

FIG. 6 depicts by way of example only first to tenth coils L-1 to L-10 of the first loop coils RF. The first to tenth coils L-1 to L-10 may be sequentially arranged along the second direction DR2. Each of the holes HL may include a first end HE1 and a second end HE2 that are spaced apart from each other along the second direction DR2.

A value of about 4 mm to about 10 mm may be given as a width HW1 (referred to hereinafter as a "hole width") in the second direction DR2 of each normal hole HN of the holes HL discussed in FIG. 5A. A width HW2 in the first direction DR1 of each of the holes HL may range from about 0.1 mm to about 0.5 mm.

A value of about 0.1 mm to about 0.3 mm may be given as a width SP1 (referred to hereinafter as a "spacing width") between two holes HL that are spaced apart from each other along the second direction DR2, and may also given as a width SP2 between two holes HL that are spaced apart from each other along the first direction DR1. Here, the width SP1 and the width SP2 may be measured as a distance between ends of two holes HL, facing each other.

A value of about 5 mm to about 20 mm in the first direction DR1 may be given as a width between the hole HL adjacent to the first non-folding part 210 and the hole HL adjacent to the second non-folding part 220.

According to an embodiment, the same distance in the second direction DR2 may be provided between the first coil L-1 and the second coil L-2, between the third coil L-3 and the fourth coil L-4, between the fifth coil L-5 and the sixth coil L-6, between the seventh coil L-7 and the eighth coil L-8, and between the ninth coil L-9 and the tenth coil L-10. The same distance may be defined as a "first distance".

According to an embodiment, the first distance may be constantly maintained on the first non-folding part 210, the folding part 230, and the second non-folding part 220.

The same distance in the second direction DR2 may be provided between the second coil L-2 and the third coil L-3, between the fourth coil L-4 and the fifth coil L-5, and between the eighth coil L-8 and the ninth coil L-9. The same distance may be defined as a "second distance". The second distance may be greater than the first distance. According to an embodiment, the second distance may be variable on the folding part 230.

On the first non-folding part 210 and the second non-folding part 220, the second distance LW may be the same as half the sum of the hole width HW1 and the spacing width SP1.

Each of the first to tenth coils L-1 to L-10 may include a first part U1 or B1 disposed on the first non-folding part 210, a second part U2 or B2 disposed on the second non-folding part 220, and a third part U3 or B3 disposed on the folding part 230.

The third part U3 included in each of the first coil L-1, the second coil L-2, the fifth coil L-5, the sixth coil L-6, the ninth coil L-9, and the tenth coil L-10 may include first patterns U-P1 adjacent to the first ends HE1 of the holes HL included in the first group holes HG1, second patterns U-P2 adjacent to the second ends HE2 of the holes HL included in the second group holes HG2, and third patterns U-P3 disposed between corresponding first patterns U-P1 and corresponding second patterns U-P2.

The third part B3 included in each of the third coil L-3, the fourth coil L-4, the seventh coil L-7, and the eighth coil L-8 may include first patterns B-P1 adjacent to the first ends HE1 of the holes HL included in the second group holes HG2, second patterns B-P2 adjacent to the second ends HE2 of the holes HL included in the first group holes HG1, and third patterns B-P3 disposed between corresponding first patterns B-P1 and corresponding second patterns B-P2.

According to the present invention, a value of about 0.5 mm to about 2 mm may be given as a width GP in the second direction DR2 between the first part U1 or B1 included in the same first loop coil RF and the first pattern U-P1 or B-P1 connected to the first part U1 or B1, or may be given as a width GP in the second direction DR2 between the second part U2 or B2 included in the same first loop coil RF and the first pattern U-P1 or B-P1 connected to the second part U2 or B2. When the width GP is less than about 0.5 mm, an interval between neighboring first loop coils RF may increase to reduce reliability of the digitizer 200, and when the width GP is equal to or greater than about 2 mm, an interval between neighboring first loop coils RF may decrease to induce sensing distortion.

According to the present invention, as the width GP between neighboring first loop coils RF is in a range of about 0.5 mm to about 2 mm, it may be possible to reduce the occurrence of sensing distortion on the folding part 230.

Referring to FIG. 7, the second loop coils CF according to an embodiment may be disposed on the folding part 230. Four or more second loop coils CF may be disposed on the folding part 230. FIG. 7 depicts by way of example four coils FC1, FC2, FC3, and FC4 of the second loop coils CF.

The first coil FC1 and the second coil FC2 may be coils that are included in one second loop coil CF to form a loop. In addition, the third coil FC3 and the fourth coil FC4 may be coils that are included in another second loop coil CF to form a loop. The present invention, however, is not limited thereto, and the first coil FC1 and one of the third and fourth coils FC3 and FC4 may be coils that are included in one second loop coil CF to form a loop in another embodiment.

The digitizer 200 according to an embodiment may be configured such that not only the first loop coils RF but also the second loop coils CF may be disposed on the folding part 230, with the result that the digitizer 200 of unitary type may be provided.

Figure 8:
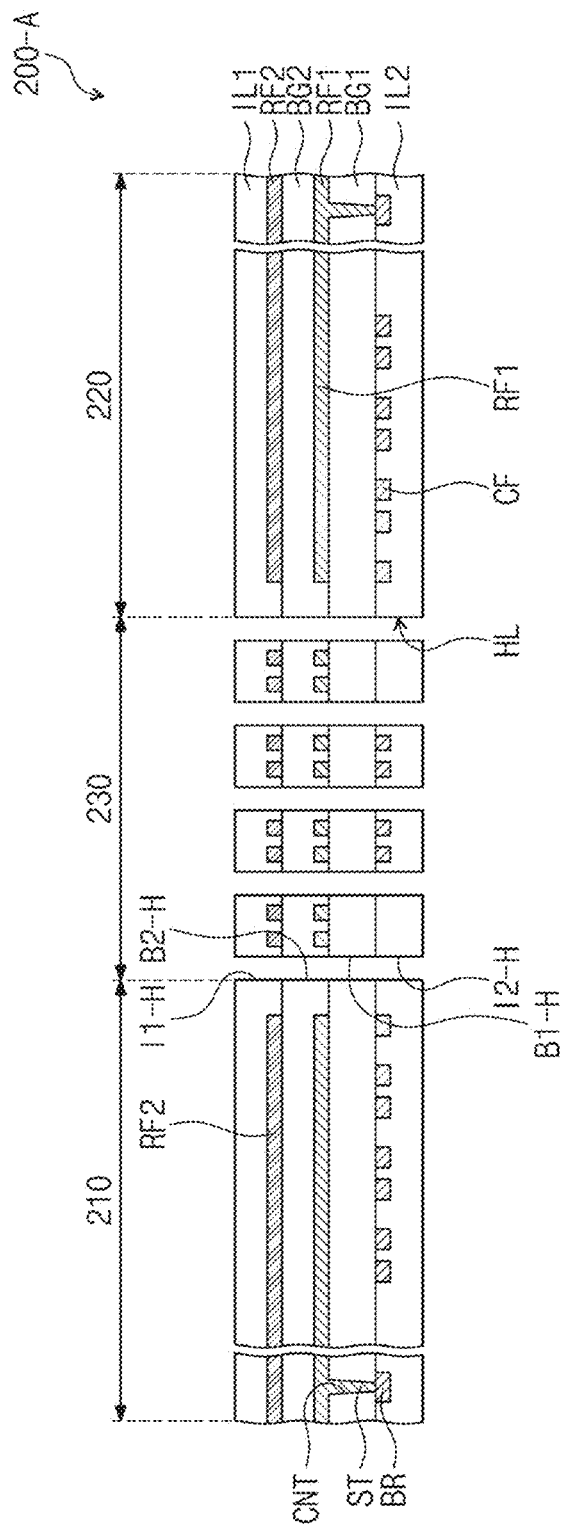
FIG. 8 illustrates a cross-sectional view showing a digitizer according to an embodiment of the present invention.
Figure 9A:
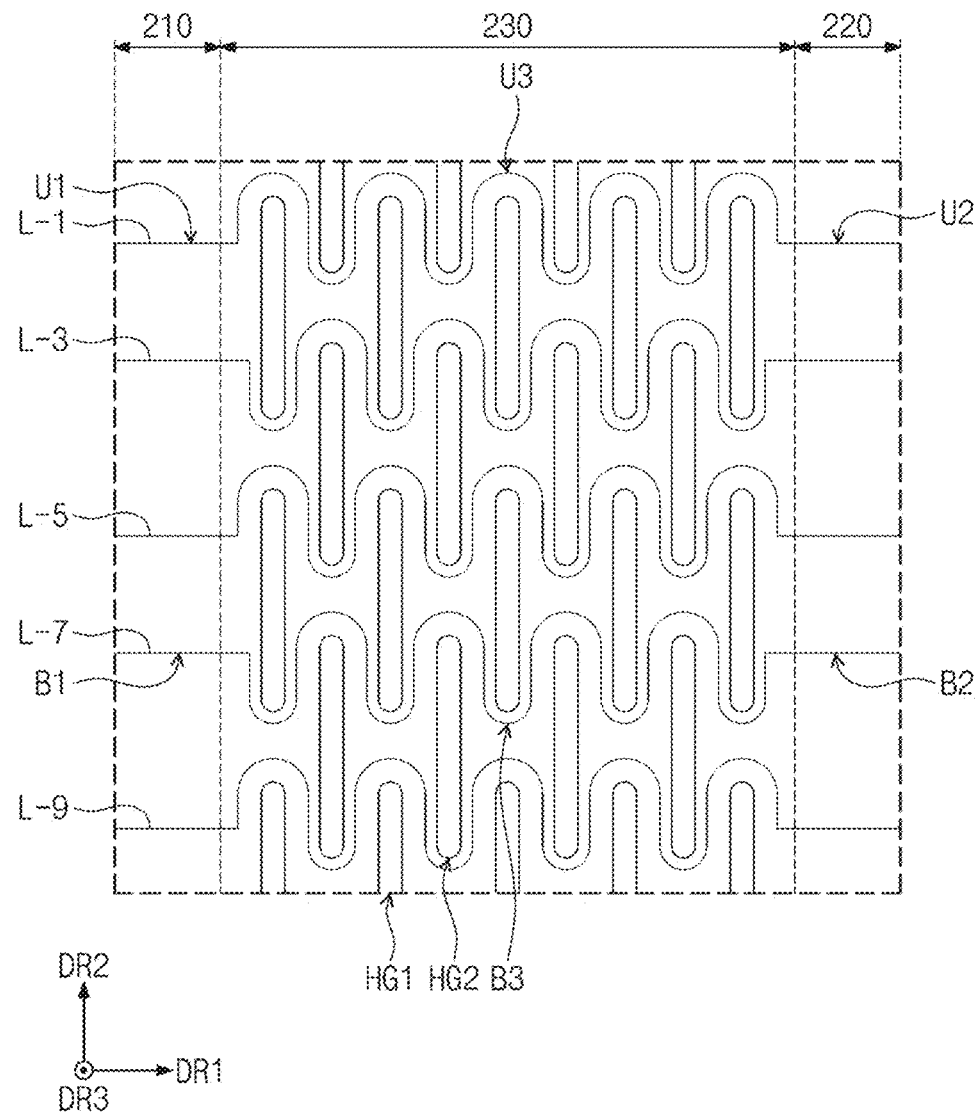
FIG. 9A illustrates an enlarged plan view partially showing a digitizer according to an embodiment of the present invention.
Figure 9B:
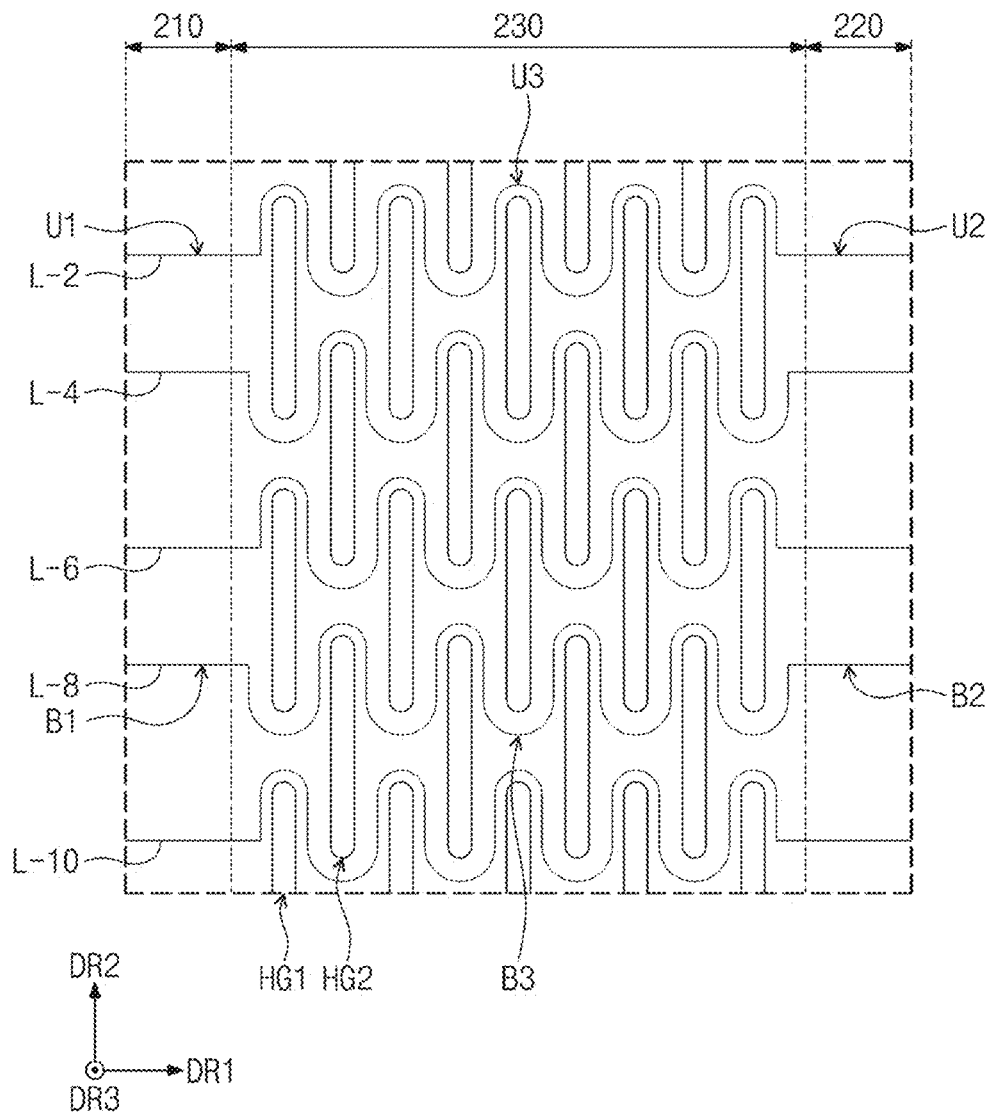
FIG. 9B illustrates an enlarged plan view partially showing a digitizer according to an embodiment of the present invention.
Figure 10A:
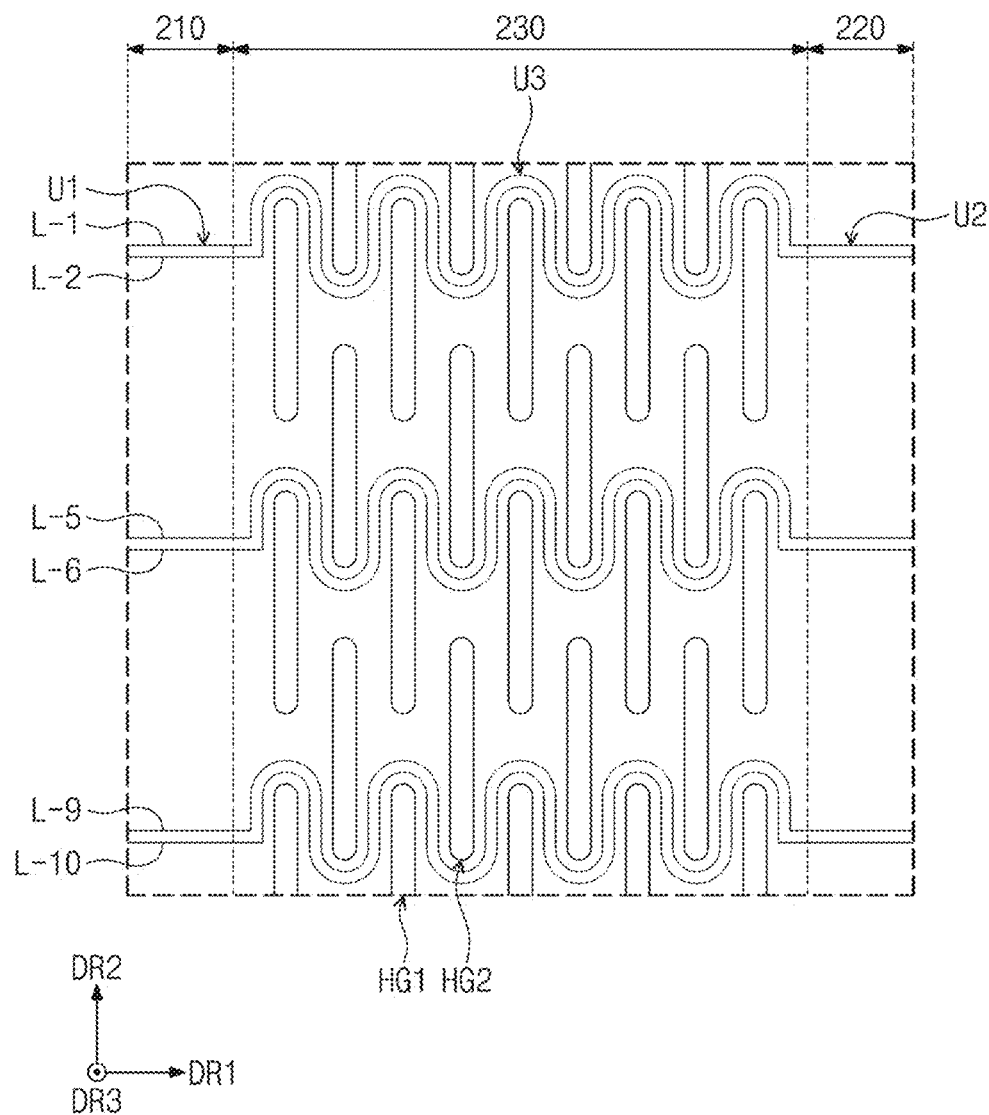
FIG. 10A illustrates an enlarged plan view partially showing a digitizer according to an embodiment of the present invention.
Figure 10B:
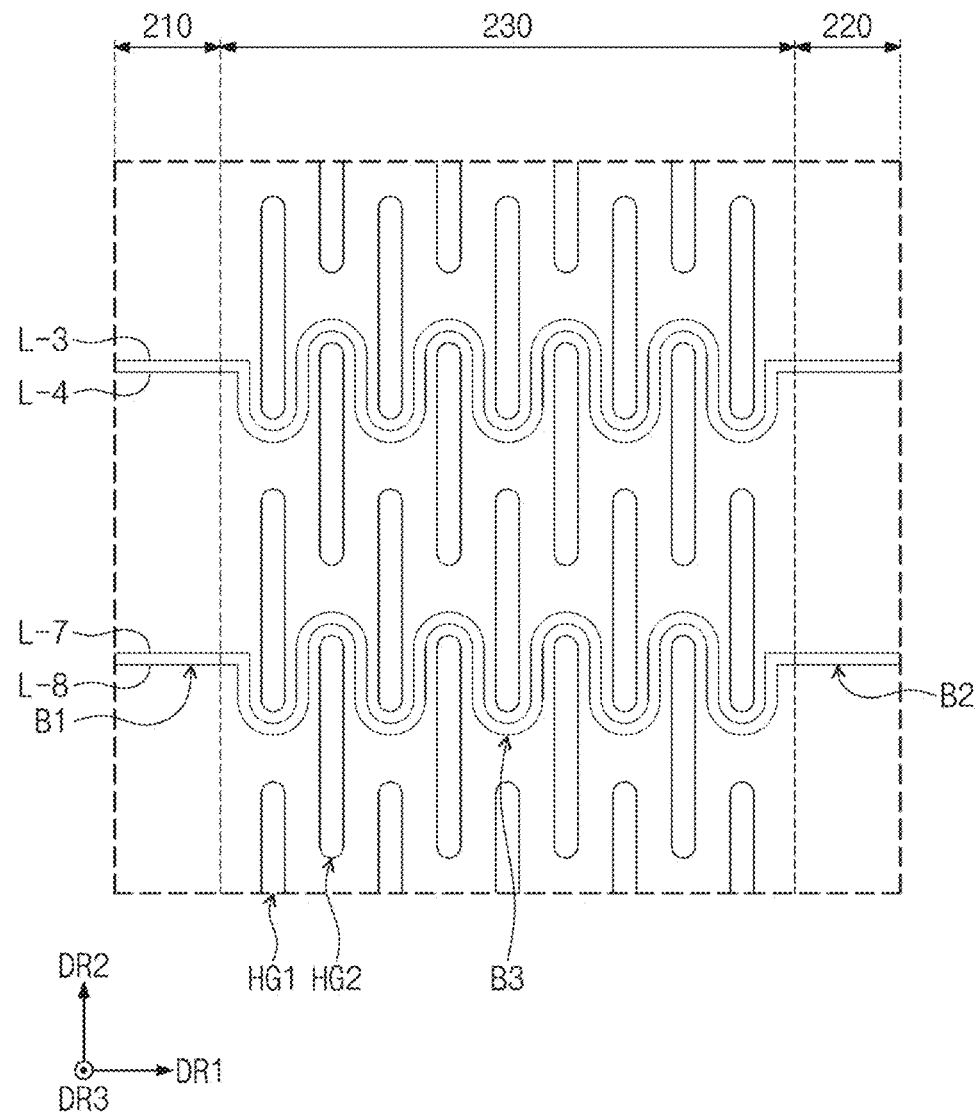
FIG. 10B illustrates an enlarged plan view partially showing a digitizer according to an embodiment of the present invention.

FIG. 8 illustrates a cross-sectional view showing a digitizer according to an embodiment of the present invention. FIG. 9A illustrates an enlarged plan view partially showing a digitizer according to an embodiment of the present invention. FIG. 9B illustrates an enlarged plan view partially showing a digitizer according to an embodiment of the present invention. FIG. 10A illustrates an enlarged plan view partially showing a digitizer according to an embodiment of the present invention. FIG. 10B illustrates an enlarged plan view partially showing a digitizer according to an embodiment of the present invention. In the embodiment that follows, components identical or similar to those of FIGS. 1 to 7 will be allocated the same reference symbols, and a repetitive description will be omitted.

Referring to FIG. 8, a digitizer 200-A according to an embodiment may include a first base layer BG1, a second base layer BG2, a first cover layer IL1, a second cover layer IL2, first loop coils RF, and second loop coils CF.

The first base layer BG1 may include first base holes BG-H1 defined to penetrate front and rear surfaces of the first base layer BG1. The front surface of the first base layer BG1 may be defined as a surface that faces a rear surface of the display module 100. A portion of the first loop coils RF may be disposed on the front surface of the first base layer BG1. The second loop coils CF may be disposed on the rear surface of the first base layer BG1.

The second base layer BG2 may be disposed on the first base layer BG1 to cover the first loop coils RF disposed on the first base layer BG1. Another portion of the first loop coils RF may be disposed on the second base layer BG2. The second base layer BG2 may include second base holes BG-H2 defined to penetrate front and rear surfaces of the second base layer BG2.

The first cover layer IL1 may be disposed on the front surface of the first base layer BG1 to cover the first loop coils RF disposed on the second base layer BG2. The first cover layer IL1 may include first cover holes I1-H defined to penetrate front and rear surfaces thereof.

The second cover layer IL2 may be disposed on the rear surface of the first base layer BG1 to cover the second loop coils CF. The second cover layer IL2 may include second cover holes I2-H defined to penetrate front and rear surfaces thereof.

Each of the holes HL defined on the folding part 230 may be formed to include a corresponding first base hole BG-H1, a corresponding second base hole BG-H2, a corresponding first cover hole I1-H, and a corresponding second cover hole I2-H that are arranged along the third direction DR3.

One of the first loop coils RF that is disposed on an outer portion of either the first non-folding part 210 or the second non-folding part 220 may be connected to a bridge pattern BR disposed on the rear surface of the first base layer BG1 through a connection pattern ST disposed in a contact hole CNT.

FIGS. 9A and 9B depict by way of example only first to tenth coils L-1 to L-10 of the first loop coils RF. The first to tenth coils L-1 to L-10 may be sequentially arranged along the second direction DR2. The first to tenth coils L-1 to L-10 may be disposed on different layers from each other.

Referring to FIGS. 9A and 9B, the first base layer BG1 may be provided thereon with the first coil L-1, the third coil L-3, the fifth coil L-5, the seventh coil L-7, and the ninth coil L-9 of the first to tenth coils L-1 to L-10, and the second base layer BG2 may be provided thereon with the second coil L-2, the fourth coil L-4, the sixth coil L-6, the eighth coil L-8, and the tenth coil L-10 of the first to tenth coils L-1 to L-10. The limitation imposed on width discussed in FIG. 6 may also be identically applicable to the embodiment of FIGS. 9A and 9B. For example, the width LW in the second direction DR2 between the second coil L-2 and the third coil L-3 discussed in FIG. 6 may correspond to a width, which is induced when viewed on a plane, between the first loop coils RF disposed on different layers from each other.

FIGS. 10A and 10B depict by way of example only first to tenth coils L-1 to L-10 of the first loop coils RF. The first to tenth coils L-1 to L-10 may be sequentially arranged along the second direction DR2. The first to tenth coils L-1 to L-10 may be disposed on different layers from each other.

Referring to FIGS. 10A and 10B, the first base layer BG1 may be provided thereon with the first coil L-1, the second coil L-2, the fifth coil L-5, the sixth coil L-6, the ninth coil L-9, and the tenth coil L-10 of the first to tenth coils L-1 to L-10, and the second base layer BG2 may be provided thereon with the third coil L-3, the fourth coil L-4, the seventh coil L-7, and the eighth coil L-8 of the first to tenth coils L-1 to L-10. The limitation imposed on width discussed in FIG. 6 may also be identically applicable to the embodiment of FIGS. 10A and 10B.

Figure 11A:
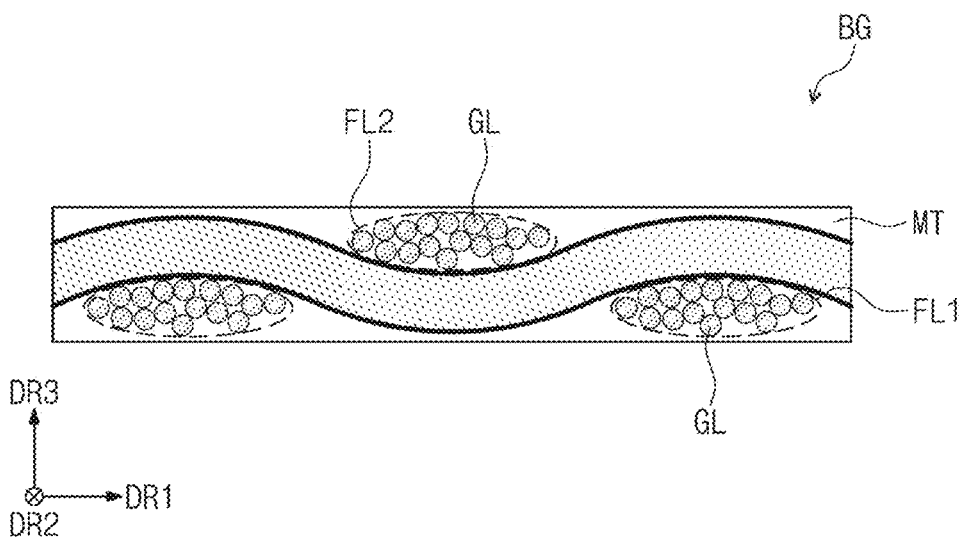
FIG. 11A illustrates a cross-sectional view showing a base layer according to an embodiment of the present invention.
Figure 11B:
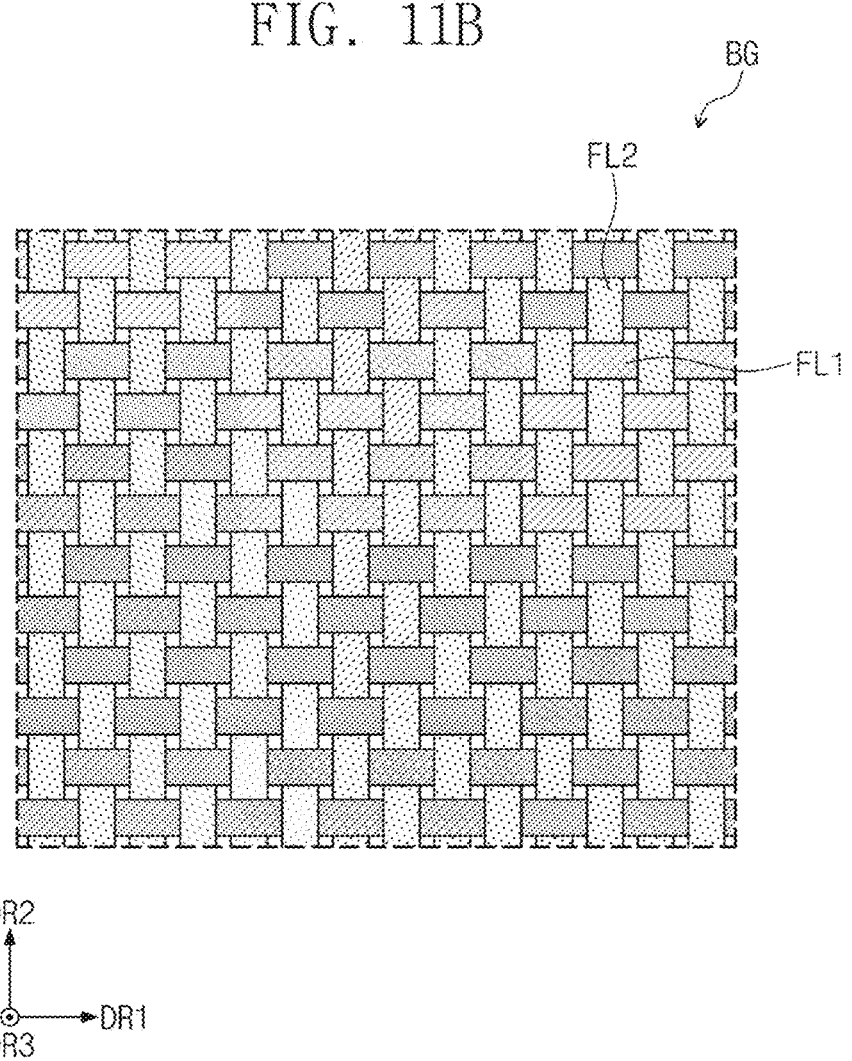
FIG. 11B illustrates a plan view showing a base layer according to an embodiment of the present invention.

FIG. 11A illustrates a cross-sectional view showing a base layer according to an embodiment of the present invention. FIG. 11B illustrates a plan view showing a base layer according to an embodiment of the present invention.

Referring to FIGS. 11A and 11B, the base layer BG according to the present invention may include a matrix MT including a filler and weave-shaped fiber lines FL1 and FL2 disposed within the matrix MT. The base layer BG may correspond to each of the base layer (see BG of FIG. 4), the first and second cover layers (see IL1 and IL2 of FIGS. 4 and 8), and the base layers (see BG1 and BG2 of FIG. 8).

The fiber lines FL1 and FL2 may be alternately arranged along the first direction DR1 and the second direction DR2 to have a textile shape when viewed on a plane. Each of the fiber lines FL1 and FL2 may be provided in the form of a bundle of a plurality of glass fibers GL. One glass fiber GL included in one fiber line FL1 or FL2 may have a diameter of about 3 μm to about 10 μm.

The fiber lines FL1 and FL2 may be glass fiber-reinforced plastic ("GFRP"). The fiber lines FL1 and FL2 may be disposed within the matrix MT. The matrix MT according to an embodiment may include at least one selected from epoxy, polyester, polyamide, polycarbonate, polypropylene, polybutylene, and vinylester.

The matrix MT may include a filler. The filler may include at least one selected from silica, barium sulphate, sintered tale, barium titanate, titanium oxide, clay, alumina, mica, boehmite, zinc borate, and zinc titanate.

According to the present invention, each base layer BG included in the digitizer (see 200 of FIG. 2) may include a bundle of glass fiber-reinforced plastics disposed within the matrix MT, and thus a lower portion of the display module (see 100 of FIG. 2) may be protected in a folding operation.

The digitizer 200 of the present invention may be a component that serves not only as a protection member but also as a sensing member. It may thus be possible to omit a separate metal plate that protects the display module 100 and a separate digitizer disposed on the folding part 230. Accordingly, there may be provided a slim electronic device 1000 whose costs are reduced.

According to the present invention, a width between neighboring loop coils may be limited to a certain value, and thus it may be possible to reduce the occurrence of sensing distortion on a folding part of a digitizer. In conclusion, there may be provided an electronic device including the digitizer whose sensitivity is improved.

Although the embodiments have been described with reference to a number of illustrative examples thereof, it will be understood by those of ordinary skill in the art that various changes in form and details may be made without departing from the spirit and scope of the present invention as set forth in the following claims.

Thus, the technical scope of the present invention is not limited by the embodiments and examples described above, but by the following claims.

What is claimed is:
1. An electronic device, comprising:
a display panel, which provides an image; and
a digitizer below the display panel and including a first non-folding part and a second non-folding part, which are arranged along a first direction, and a folding part between the first non-folding part and the second non-folding part, wherein the folding part is foldable with respect to a folding axis extending along a second direction intersecting the first direction,
wherein the folding part includes first group holes each including holes arranged along the second direction, and second group holes between neighboring first group holes of the first group holes and each including holes arranged along the second direction,
wherein the digitizer includes:
a base layer;
first loop coils on the base layer and each including a first part on the first non-folding part, a second part on the second non-folding part, and a third part on the folding part, wherein the third part surrounds a portion of corresponding holes of the first and second group holes; and
second loop coils insulated from the first loop coils and below the base layer,
wherein each of the holes of the first and second group holes extends in the second direction and includes a first end and a second end that are spaced apart from each other in the second direction,
wherein the third part includes:
first patterns adjacent to the first ends of corresponding holes of the first and second group holes;
second patterns adjacent to the second ends of corresponding holes of the first and second group holes; and
third patterns that connect corresponding first patterns to corresponding second patterns,
wherein each of the first patterns and the second patterns has a curvature.

2. The electronic device of claim 1, wherein a maximum width in the second direction between the first part and each of the first patterns is in a range of about 0.5 mm to about 2 mm.

3. The electronic device of claim 1, wherein the holes include normal holes extending along the second direction and cutting holes adjacent to opposite edges of the folding part in the second direction,
wherein each of the cutting holes has an area less than an area of each of the normal holes,
wherein a width in the first direction of each of the holes is in a range of about 0.1 mm to about 0.5 mm.

4. The electronic device of claim 3, wherein
a width in the second direction of each of the normal holes is in a range of about 4 mm to about 10 mm,
a width in the second direction of each of the cutting holes is in a range of about 0.6 mm to about 3.5 mm, and
five or more cutting holes are defined on each of the opposite edges of the folding part that are spaced apart from each other along the second direction.

5. The electronic device of claim 1, wherein
two first patterns included two first loop coils are disposed between two holes adjacent to each other in the second direction, and
two second patterns included in other two first loop coils are disposed between the two holes adjacent to each other in the second direction.

6. The electronic device of claim 5, wherein a width between the two holes adjacent to each other in the second direction is in a range of about 0.1 mm to about 0.3 mm.

7. The electronic device of claim 1, wherein two third patterns included in different first loop coils are between two holes adjacent to each other in the first direction.

8. The electronic device of claim 7, wherein a width between the two holes adjacent to each other in the first direction is in a range of about 0.1 mm to about 0.3 mm.

9. The electronic device of claim 1, wherein a width in the first direction between the hole adjacent to the first non-folding part and the hole adjacent to the second non-folding part is in a range of about 5 mm to about 20 mm.

10. The electronic device of claim 1, further comprising:
a first cover layer on the base layer and covering the first loop coils; and
a second cover layer below the base layer and covering the second loop coils.

11. The electronic device of claim 10, wherein the base layer, the first cover layer, and the second cover layer include a matrix including a filler and weave-shaped fiber lines within the matrix.

12. The electronic device of claim 11, wherein
the matrix includes at least one selected from epoxy, polyester, polyamide, polycarbonate, polypropylene, polybutylene, and vinylester, and
the filler includes at least one selected from silica, barium sulphate, sintered talc, barium titanate, titanium oxide, clay, alumina, mica, boehmite, zinc borate, and zinc titanate.

13. The electronic device of claim 1, wherein the first loop coils include first to fourth coils that are sequentially arranged along the second direction,
wherein a first distance in the second direction between the first part included in the first coil and the first part included in the second coil is the same as a second distance in the second direction between the first part included in the third coil and the first part included in the fourth coil.

14. The electronic device of claim 13, wherein a third distance between the first part included in the second coil and the first part included in the third coil is greater than the first distance.

15. The electronic device of claim 1, further comprising an additional base layer on the base layer,
wherein the first loop coils include first to eighth coils that are sequentially arranged along the second direction,
wherein in parts of the first to eighth coils on the first non-folding part and the second non-folding part,
a distance in the second direction between the first coil and the second coil, a distance in the second direction between the third coil and the fourth coil, a distance in the second direction between the fifth coil and the sixth coil, and a distance in the second direction between the seventh coil and the eighth coil each are less than a first distance in the first direction between two holes of the holes, the two holes being adjacent in the first direction, and
a distance in the second direction between the second coil and the third coil, a distance in the second direction between the fourth coil and the fifth coil, and a distance in the second direction between the sixth coil and the seventh coil each are greater than the first distance.

16. The electronic device of claim 15, wherein
the first coil, the second coil, the fifth coil, and the sixth coil are on the base layer, and
the third coil, the fourth coil, the seventh coil, and the eighth coil are on the additional base layer.

17. The electronic device of claim 15, wherein
the first coil, the third coil, the fifth coil, and the seventh coil are on the base layer, and
the second coil, the fourth coil, the sixth coil, and the eighth coil are on the additional base layer.

18. The electronic device of claim 1, a total number of the second loop coils disposed on the folding part is equal to or greater than four.

19. The electronic device of claim 1, wherein the second group holes each are disposed shifted along the second direction at a certain distance from each of the first group holes.

20. The electronic device of claim 11, wherein the digitizer is configured to use an electromagnetic resonance (EMR) method to detect an external input.

* * * * *